US011313477B2

(12) United States Patent
Liu et al.

(10) Patent No.: US 11,313,477 B2
(45) Date of Patent: Apr. 26, 2022

(54) BALL VALVE WITH FORCED-SEALING OPERATION

(71) Applicant: Zibo Votaisi Petrochemical Equipment Co., Ltd, Zibo (CN)

(72) Inventors: Zhigang Liu, Beijing (CN); Jimeng Chen, Zibo (CN); Xiaoqi Liu, Bejing (CN)

(*) Notice: Subject to any disclaimer, the term of this patent is extended or adjusted under 35 U.S.C. 154(b) by 0 days.

(21) Appl. No.: 17/118,739

(22) Filed: Dec. 11, 2020

(65) Prior Publication Data

US 2021/0095770 A1    Apr. 1, 2021

Related U.S. Application Data

(63) Continuation-in-part of application No. PCT/CN2020/105504, filed on Jul. 29, 2020.

(30) Foreign Application Priority Data

Sep. 20, 2019  (CN) .......................... 201910889922.5
Dec. 13, 2019  (CN) .......................... 201911279837.3

(51) Int. Cl.
| F16K 5/06 | (2006.01) |
| F16K 5/20 | (2006.01) |
| F16K 35/10 | (2006.01) |
| F16K 27/06 | (2006.01) |
| F16K 5/08 | (2006.01) |

(52) U.S. Cl.
CPC .............. *F16K 5/0647* (2013.01); *F16K 5/06* (2013.01); *F16K 5/08* (2013.01); *F16K 5/204* (2013.01); *F16K 27/067* (2013.01); *F16K 35/10* (2013.01)

(58) Field of Classification Search
CPC ........ F16K 1/24; F16K 5/0605; F16K 5/0673; F16K 5/0647; F16K 5/204; F16K 5/10; F16K 5/14; F16K 5/16; F16K 5/18; F16K 5/182; F16K 5/184; F16K 5/186;
(Continued)

(56) References Cited

U.S. PATENT DOCUMENTS 1,639,743 A * 8/1927 Marscheider ........... F16K 5/204
                                                      251/163
1,949,834 A * 3/1934 Heggem ................. F16K 5/204
                                                      251/163
(Continued)

FOREIGN PATENT DOCUMENTS

CN          103742666 A      4/2014

*Primary Examiner* — Hailey K. Do
(74) *Attorney, Agent, or Firm* — Larson & Larson, P.A.; Justin P. Miller; Frank Liebenow

(57) ABSTRACT

The present disclosure relates to a DBB forced sealing valve and an operating mechanism, including a valve body, a valve seat, a valve core arranged in the valve body, upper sealing member driving part and lower sealing member driving part arranged in the valve body and located on either side of the valve core, and the sealing members arranged between the valve seats and the upper sealing member driving part and the lower sealing member driving part. Wherein, the upper sealing member driving part and the lower sealing member driving part can move along the rotation axis of the valve core, and the upper sealing member driving part and the lower sealing member driving part drive the sealing members to press against or to retract from the valve seats.

17 Claims, 29 Drawing Sheets

(58) Field of Classification Search
CPC .......... F16K 5/187; F16K 5/162; F16K 5/165;
F16K 5/166; F16K 5/167; F16K 27/067
See application file for complete search history.

(56) References Cited

U.S. PATENT DOCUMENTS

| | | | | |
|---|---|---|---|---|
| 4,940,210 A | * | 7/1990 | Gilmore | ................ F16K 5/204 251/188 |
| 2017/0343120 A1 | * | 11/2017 | Liu | ........................ F16K 5/204 |

* cited by examiner

BALL VALVE WITH FORCED-SEALING OPERATION

CROSS-REFERENCE TO RELATED APPLICATION

This application is continuation-in-part of PCT/CN2020/105504 filed on Jul. 29, 2020, which claimed priority to CN201910889922.5 filed on Sep. 20, 2019.

This application is also a continuation-in-part of CN201911279837.3 filed on Dec. 13, 2019.

FIELD

This invention relates to the field of ball valves and more particularly to a ball valve that splits to force a seal upon closure.

BACKGROUND

DBB forced sealing valve has outstanding sealing performance. While the valve is in closed position, its sealing integration can be verified with valve inline and under pressure, which ensures the reliability of valve closing. DBB forced sealing valves are needed for many important applications. For example, in a tank farm, different storage tanks are usually used to store different media which have to be strictly isolated to prevent any potential huge loss caused by contamination of the media. Hence, DBB forced sealing valves must be used for isolation valves of the tanks and shut-off valves of the tank farm. Similarly, in oil or natural gas metering, airport fuel systems, and other scenarios that require verifiable tight shut-off, the application of DBB forced sealing valves is always mandatorily required by major international codes and standards.

At present, DBB forced sealing valves on the market are a kind of expansion plug valves, as shown in FIG. 10. Its structural feature is that the valve core is composed of a wedge plug and two discs on both sides. The valve core rotates between the on/off positions friction free. At the closed position, the wedge plug is driven down by the valve stem, and the discs are pushed through the wedge inclined surfaces to achieve a forced seal. The valve stem has to complete complex rotational and linear movements through a complicated operating mechanism during the entire valve opening and closing operations. Since the linear movement of the valve stem is in the same direction as the escape of medium, leaking at the stem of this kind of valves is easy to occur. Besides, the complicated operating mechanism is arranged at the valve stem, so that the size of the valve stem part of this kind of valves is huge, usually more than double the height of the valve body. In addition, the valve core has to adopt a geometric shape similar to that of a plug valve. Limited by its geometric structure, if the flow passage of this kind of valve adopts a full port, the valve body will be very large. Therefore, such valves usually have to adopt reduced port designs, such as a rectangle or a rhombus passage. Such a compromise design has a huge impact on the flow capacity of the valve.

What is needed is a system that will allow for reliable forced-sealing of a ball valve.

SUMMARY

The purpose of the present disclosure is to propose a technical solution for a DBB forced sealing valve and an operating device, optimize the structural design of DBB forced sealing valves, improve the sealing reliability at the valve stem, improve the flow capacity of the valve, and make the operating mechanism simple and reliable in structure.

In order to achieve the above purpose, the technical solution of the present disclosure is: a DBB forced sealing valve, including a valve body, a valve seat, a valve core arranged in the valve body, upper sealing member driving part and lower sealing member driving part arranged inside the valve body and located on each side of the valve core respectively; and the sealing members arranged between the valve seat and the upper sealing member driving part and the lower sealing member driving part. The upper sealing member driving part and the lower sealing member driving part can move along the rotation axis of the valve core, and the upper sealing member driving part and the lower sealing member driving part drive the sealing members to press or detach from the valve seat.

Furthermore, the valve core is provided with a flow passage; the upper sealing member driving part and the lower sealing member driving part are located on each side of the flow passage.

Furthermore, the DBB forced sealing valve includes a valve stem that drives the valve core to rotate.

Furthermore, in order to drive the upper sealing member driving part and lower sealing member driving part to move along the valve core rotation axis, the DBB forced sealing valve further includes an upper driving shaft and a lower driving shaft located on the valve core and on each side of the flow passage. The upper driving shaft and the lower driving shaft drive the upper sealing member driving part and the lower sealing member driving part to move along the rotation axis of the valve core through threads.

Furthermore, to drive the upper sealing member driving part and the lower sealing member driving part along the valve core rotation axis in opposite directions, the threads of the upper driving shaft and the lower driving shaft are in opposite directions.

Furthermore, to effectively drive the sealing member to achieve forced sealing, the upper sealing member driving part is provided with an upper driving track for driving the sealing member, and the upper driving track is inclined to the rotation axis of the valve core; The lower sealing member driving part is provided with a lower driving track for driving the sealing member, and the lower driving track is inclined to the rotation axis of the valve core.

Furthermore, a preferred driving track structure is that the upper driving track and the lower driving track are dovetail tracks.

Furthermore, the lower sealing member driving part is provided with guiding holes; the upper sealing member driving part is provided with guiding bars correspondingly inserted into the guiding holes.

Furthermore, the valve body includes a valve bonnet; the valve bonnet is provided with a limiting groove; the upper sealing member driving part is provided with a limiting rod corresponding to the limiting groove.

Furthermore, one end of the valve stem is provided with a hexagonal head; one end of the upper driving shaft is provided with an inner hexagonal hole; the hexagonal head is located in the inner hexagonal hole and fits with the inner hexagonal hole.

In a second embodiment, the operating device for a DBB forced sealing valve comprises a valve core arranged in the valve body of the DBB forced sealing valve; a locking rocker arm set in the sealing member driving part of the DBB forced sealing valve; and a rocker arm base surface provided in the valve body. The rocker arm base surface is provided with a locking guide groove.

The valve core drives the valve sealing member driving part to rotate within the rotation stroke between the open position and the closed position. When the valve sealing member driving part rotates to the closed position, the valve core toggles the rocker arm to enter the locking guide groove, and the valve core continues to rotate towards the closing direction, driving the upper sealing member driving part to move along the rotation axis of the valve core. The locking rocker arm moves in the locking guide groove.

Furthermore, the locking rocker arm is provided with a rotating rocker. The valve core is provided with a rocker guide groove and a rocker guide surface. When the valve sealing member driving part rotates between its open position and closed position, the rotating rocker is embedded in the rocker guide groove, and the locking rocker arm moves under the restriction of the base surface of the rocker arm. The valve core also drives the sealing member driving part to rotate. When the sealing member driving part rotates to the closed position, the rocker guide groove rotates the locking rocker arm through the rotating rocker, and the locking rocker arm enters the locking guide groove. The rotating rocker moves on the rocker guide surface.

Furthermore, to ensure that the locking rocker arm can leave the locking guide groove during the opening operation, the rocker guide groove is provided at the starting end of the rocker guide surface.

Furthermore, to ensure that the locking rocker arm can enter the locking guide groove during the closing operation, the opening end of the locking guide groove is provided with a transition groove. When the sealing member driving part rotates to the closed position, the locking rocker arm enters the locking guide groove through the transition groove.

The beneficial features of the present disclosure are: a balanced design is adopted for the valve core, which completely solves the problems of the rising valve stems used in the current DBB forced sealing valves. This greatly simplifies the structure of the valve stem and greatly improves the sealing reliability of the valve stem. More importantly, upper and lower sealing member driving parts are adopted to drive the motion and forced sealing of the sealing members via a two-way slope. This can effectively reduce the structural size of the valve and essentially optimize the geometric shape of the valve core. Consequently, the valve flow passage can naturally adopt a round shape to match the shape of the pipeline, which greatly improves the flow capacity of the valve and makes the overall size of the valve body very compact. The geometric optimization of the upper sealing member driving part, the lower sealing member driving part and the valve core also allows the valve body structure to differ from the complex casting valve body structure that the current DBB forced sealing valves have to adopt. The valve body of the DBB forced sealing valve in the present disclosure can flexibly adopt the side-entry structure, the top-entry structure or the all-welded structure of ordinary ball valves, and thus can easily adapt to a variety of applications. The valve core is used to drive the rocker arm; this mechanism makes the structure of the valve compact and the opening and closing of the valve convenient and reliable.

To achieve the above object, the technical solution of the present invention is: A lock pin operating device comprises a locking pin (140), the lock pin holding member (130), the lock pin driving member (110) and a base (120), the lock pin holding member (130) rotates back and forth within the set reciprocating stroke; the locking pin comprises a locking pin shaft (144) and cam (141), the cam is provided with a drive cam end (142) and the locking cam end (143), The lock pin is installed on the lock pin holding member, the lock pin cam (141) is located between the lock pin driving member and the base; the lock pin driving member is provided with a driving groove (111) for accommodating the drive cam end (142), the base is provided with a locking groove (121) for accommodating the locking cam end (143).

Furthermore, in order to realize the operating function, the cam drive cam end (142) is embedded in the drive groove (111), the locking cam end (143) comes out of the locking groove (121) while the lock pin holding member is rotated within the set reciprocating stroke. When the lock pin holding member rotates to the positive end of the rotation stroke, the locking cam end (143) of the cam is embedded in the locking groove (121), the drive cam end (142) comes out of the drive grooves (111), the lock pin holding member is locked, the lock pin driving member (110) rotates against the lock pin holding member (130).

Furthermore, in order to make the lock pin device more compact in size, the lock pin holding member (130) is provided with a lock pin hole (132), the lock pin shaft (144) rotatably mounted in the lock pin hole; when the lock pin driving member (110) rotates against the lock pin holding member, the lock pin driving member drives the lock pin to move axially in a spiral way, the lock pin driving member is provided with a spiral surface (114), the helical screw lead of the spiral surface is the same as helical screw lead of the lock pin driving member to drive the lock pin holding member, the spiral surface stops the lock pin so that the lock pin shaft will not come out of the lock pin hole.

Furthermore, another lock pin mechanism is: the upper end of lock pin holding member (130) is provided with a lock pin block (135), the lock pin block is located between the locking pin driving member and the base, the lock pin holding member is provided with a cam groove (136) and the lock pin cam (141) is arranged in the cam groove.

Furthermore, in order to enable a bigger over stroke of the lock pin driving member, the base (120) is provided with the reverse stroke stop (123), the lock pin driving member (110) is provided with a key (13), a reverse limit ring (150) is sleeved on the lock pin driving member, and the reverse limit ring is rotationally matched with the lock pin driving member, and both ends of the reverse limit ring are respectively provided with the first shift block (151) and the second shift block (152). When the lock pin driving member rotates in the reverse direction, the key shifts the first shift block, the reverse stroke stop of the base blocks the second shifting block when the lock pin holding member (130) rotates to the reverse end point of the rotation stroke.

Furthermore, in order to drive the lock pin holding member to rotate reversely, the upper end of the lock pin holding member (130) is provided with a convex block (131); the lock pin driving member (110) is provided with actuation piece (112), When the lock pin driving member rotates in the reverse direction, the actuation piece (112) drives the convex block (131).

Furthermore, in order to drive the lock pin holding member to rotate reversely, the locking pin is provided with screw driving member (170), the screw driving member is provided with upper drive thread (173) for driving the lock pin holding member to move axially, the screw driving member is provided with a shift pin (175), the lock pin driving member (110) drives the screw drive body (170) to rotate synchronously, the lower end of the lock pin holding member (130) is provided with shift pin groove (137), a shift pin block (138) is provided in the shift pin groove; the screw driving member drives the lock pin holding member to move axially via upper drive thread (173), the shift pin (175) is in the shift pin groove (137) and drives the shift pin block (138) when the screw driving member (170) reversely rotates against the lock pin holding member (130); the shift pin (175) moves out of the shift pin groove (137) and stagger the shift pin block (138) when the screw driving member (170) rotates forwardly against the lock pin holding member (130).

Furthermore, as one kind of preferred application device, the lock pin device is for operating the DBB forced sealing valve, the lock pin driving member (110) being the stem of the DBB forced sealing valve, the base (120) is the bonnet of the DBB forced sealing valve, the lock pin holding member (130) is the upper sealing member drive member of the DBB forced sealing valve, the stem drives the valve core to rotate synchronously, the valve core used as the screw driving member (170) to drive the upper sealing member drive member to move axially along the rotating shaft through the thread.

The present invention benefits are: to control driving relationship between lock pin driving member and the lock pin holding member via lock pin; and the lock pin driving member may not only drive the lock pin holding member to rotate synchronously within a set stroke, but also rotate independently in a beyond-stroke other than the set stroke. The locking relationship between the lock pin driving member and the lock pin holding member or the lock relationship between the lock pin holding member and the base is controlled by the lock pin via the lock pin cam. Good operating function is thus achieved. Based on actual testing, the switching is very smooth, which is an obvious improvement over other solutions; the spiral surface of the lock pin driving member is used to constrain the axial position of the lock pin, which simplifies the structure, facilitates manufacturing and improves reliability; A reverse limit ring is applied to control the initial position of the lock pin driving member, increasing the beyond-stroke of the lock pin driving member, significantly improve the effect of the application of the operating device; applying to the DBB forced sealing valve, the structure is compact, the operation of the valve between on/off is smooth and reliable.

The present invention will be described in detail below with reference to drawings and embodiments.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
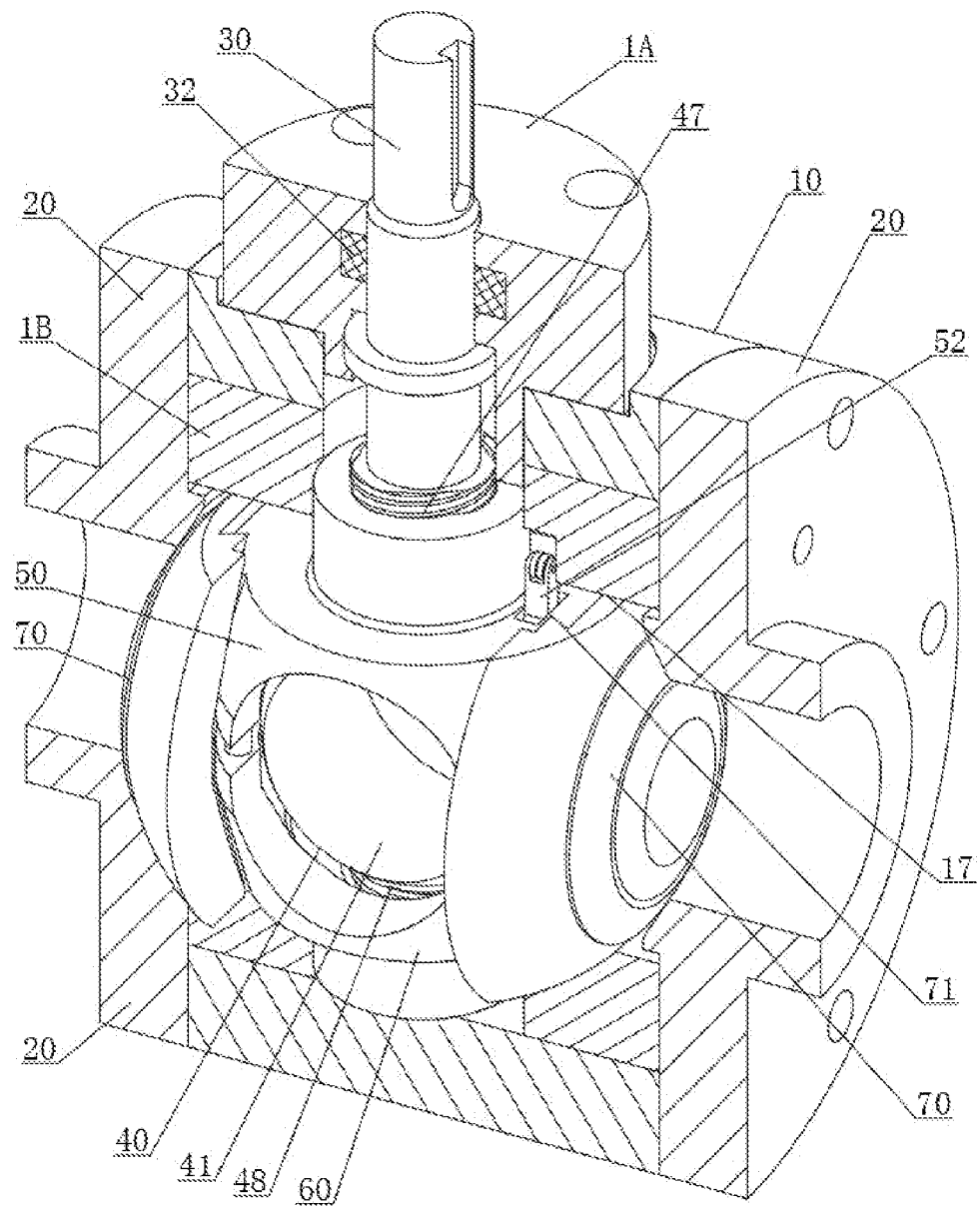
FIG. 1 is a schematic structural diagram of the DBB forced sealing valve in an embodiment of the present disclosure.
Figure 2:
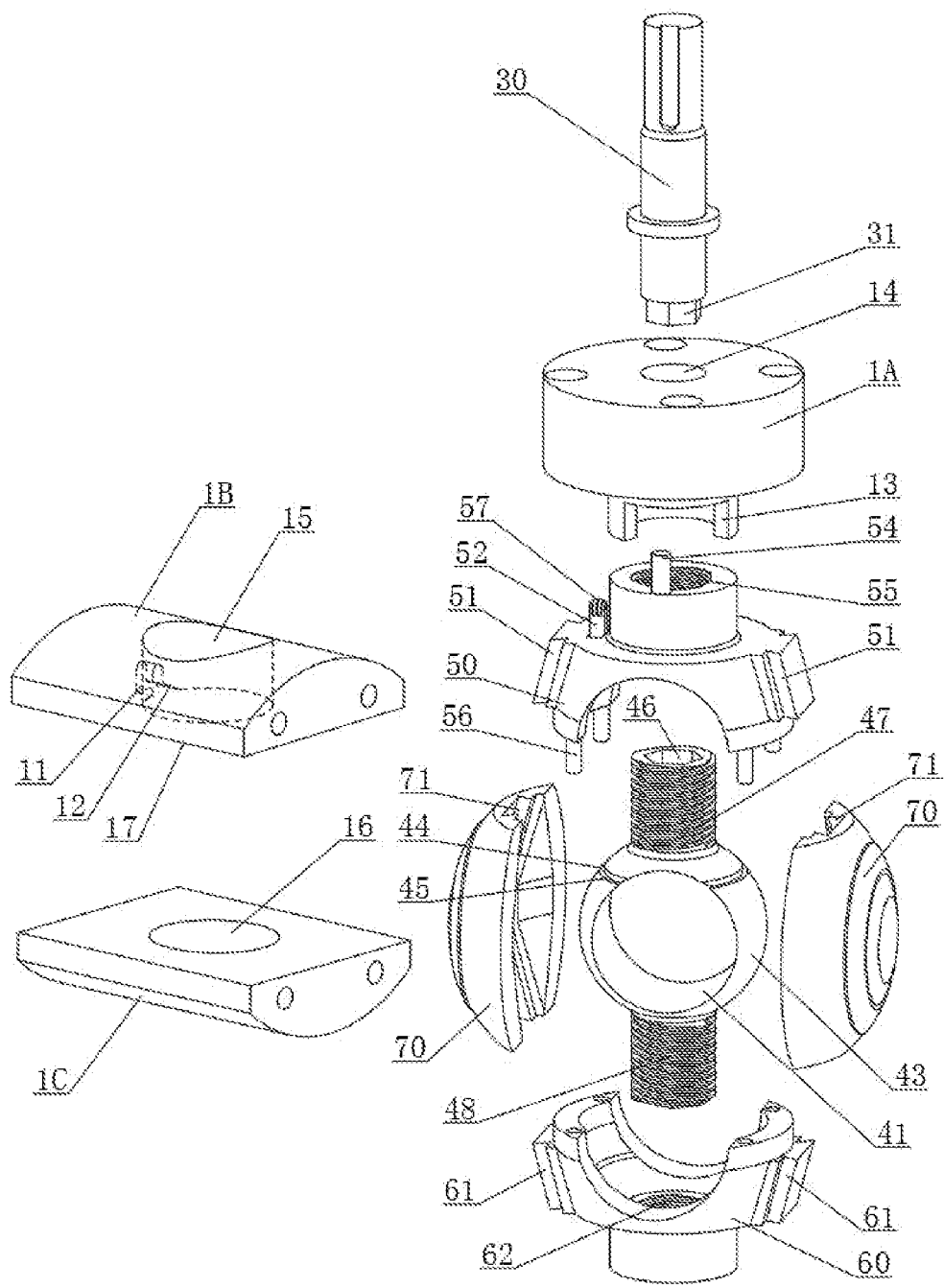
FIG. 2 is an exploded view of the DBB forced sealing valve in FIG. 1.
Figure 3:
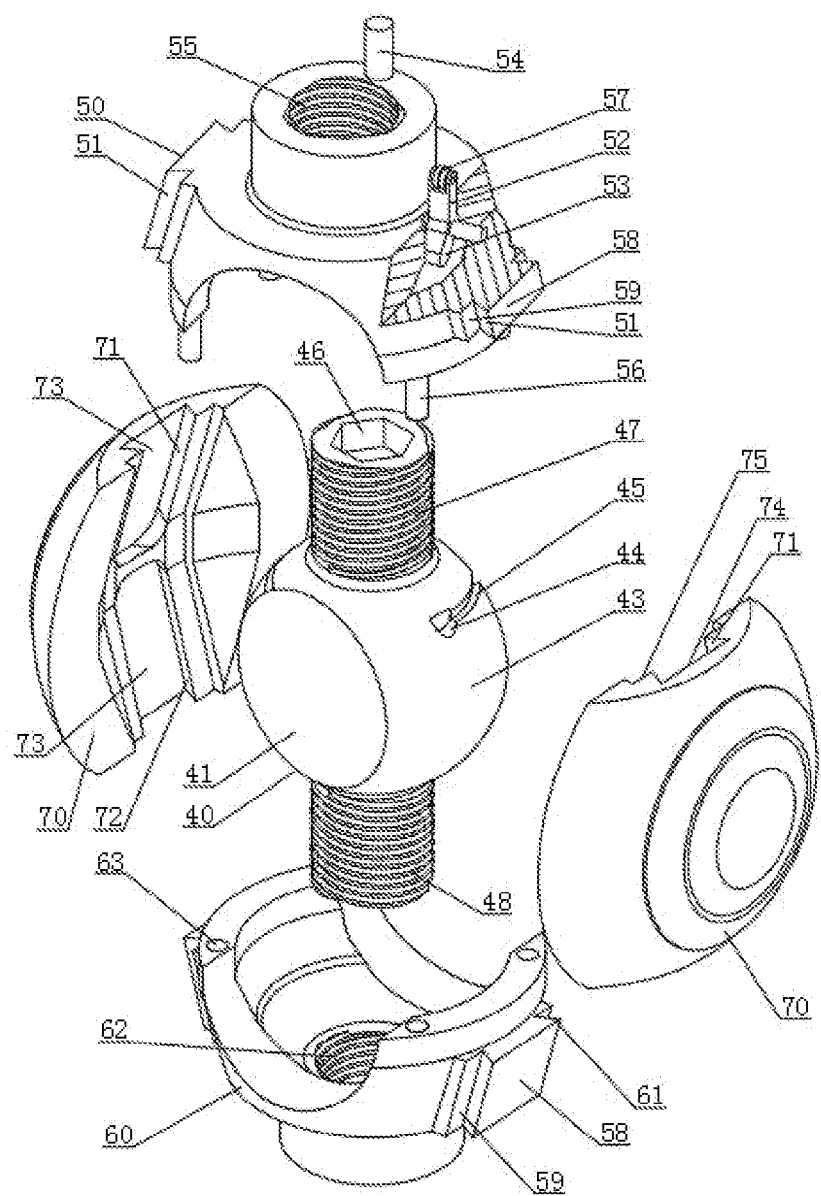
FIG. 3 is a local exploded view of the valve core, the upper sealing member driving part, the lower sealing member driving part and the sealing members in an embodiment of the present disclosure.

Reference will now be made in detail to the presently preferred embodiments of the invention, examples of which are illustrated in the accompanying drawings. Throughout the following detailed description, the same reference numerals refer to the same elements in all figures.

As shown in FIGS. 1 to 4, a DBB forced sealing valve includes a valve body 10, a valve seat 20, and a valve stem 30. The valve stem drives the valve core 40 to rotate. The valve core is provided with a flow passage 41. An upper sealing member driving part 50 and a lower sealing member driving part 60 are provided on either side of the flow passage respectively. When the valve core rotates relative to the upper sealing member driving part and the lower sealing member driving part, the upper sealing member driving part and the lower sealing member driving part move along the rotation axis of the valve core, and the upper sealing member driving part and the lower sealing member driving part drive the sealing member 70 to press against or to retract from the valve seats.

An upper drive shaft 47 and a lower drive shaft 48 are provided on either side of the valve core flow passage respectively. The upper drive shaft and the lower drive shaft drive the upper sealing member driving part and the lower sealing member driving part using threads.

The threads direction of the upper drive shaft is opposite to the thread's direction of the lower drive shaft.

The upper sealing member driving part is provided with an upper driving track 51 for driving the sealing member, and the upper driving track is inclined relative to the rotation axis of the valve core; the lower sealing member driving part is provided with a lower driving track 61 for driving the sealing member, and the lower driving track is inclined relative to the rotation axis of the valve core.

The upper driving track and the lower driving track are dovetail tracks.

Also shown are first inner flat bearing surface 58 and second inner flat bearing surface 59 that are part of the lower sealing member driving part 60.

The sealing members 70 each include one or more pocket 73, which include first outer flat bearing surface 74 and second outer flat bearing surface 75.

The first inner flat bearing surface 58 and second inner flat bearing surface 59 interface with the first outer flat bearing surface 74 and second outer flat bearing surface 75, allowing a sliding motion of the sealing members 70 with respect to the lower sealing member driving member part 60. The surfaces 58/59/74/75 are flat and planar, and also of consistent width. By being flat and consistent width, the surfaces 58/59/74/75 maintain a consistent contact surface regardless of the position of the sealing members 70. If the surface was conical, the contact area would change with position. If the surface with cylindrical, forward/backward rotation of the sealing members 70 would create instability.

But being flat and planar, forward/backward rotation of the sealing members 70 is prevented, and consistent contact area is maintained.

The surfaces 58/59/74/75 are set at differing heights, creating an interface akin to a tongue-in-groove joint. Or, as shown in the figures, a dovetail joint where the "tongue" widens at its tip, locking into the "groove", or the first inner flat bearing surface 58 locking inside the first outer flat bearing surface 74.

Figure 4:
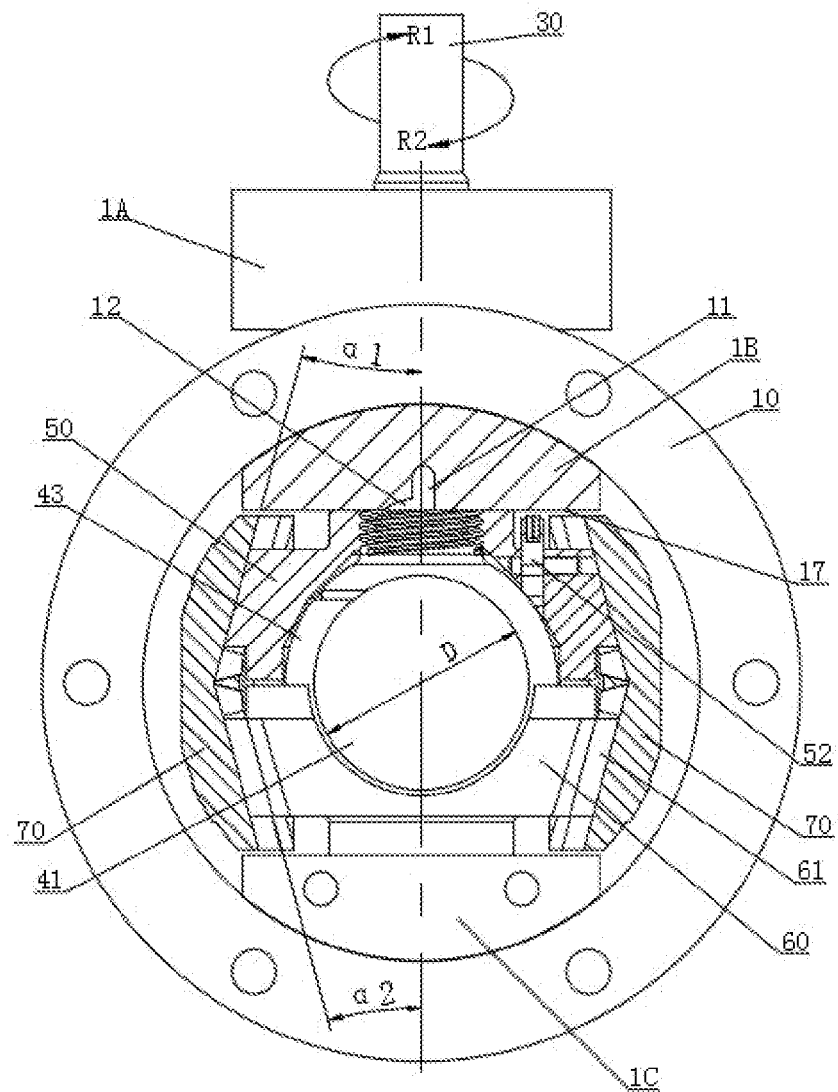
FIG. 4 is an axial view of the valve body in an embodiment of the present disclosure. The valve seats are omitted and the valve is in its open position.
Figure 7:
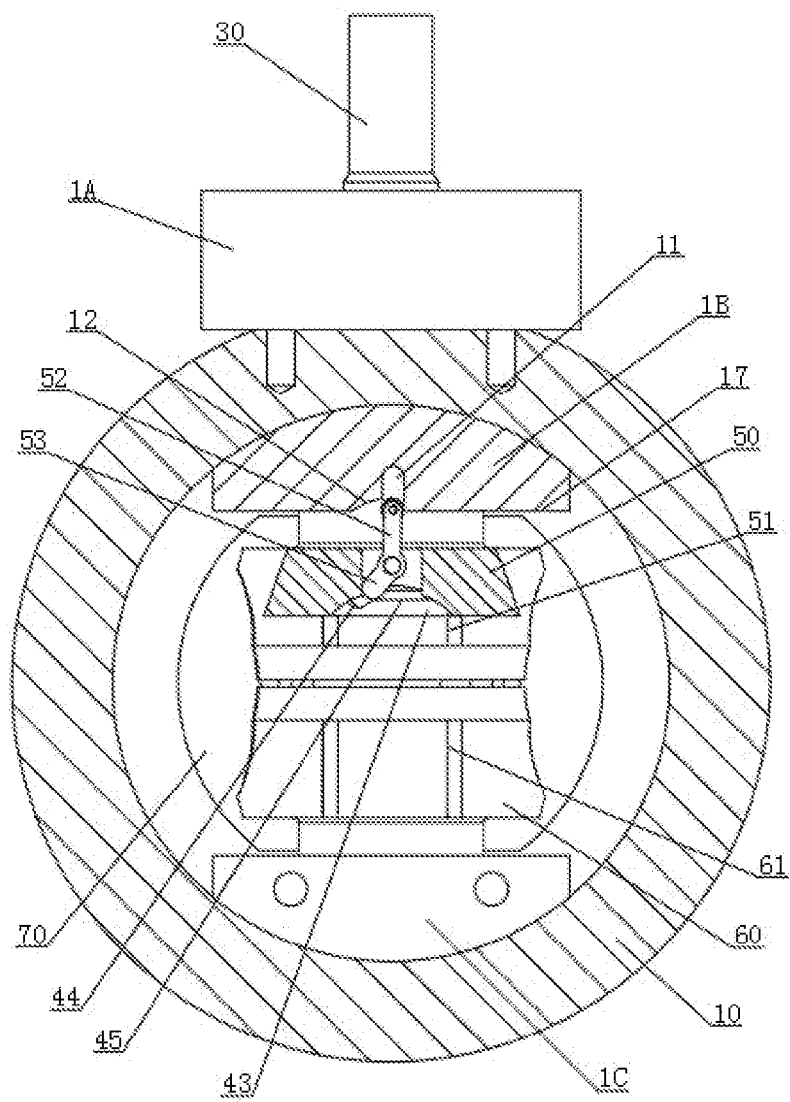
FIG. 7 is an axial view of the valve body in an embodiment of the present disclosure. The valve seats are omitted, the upper sealing member driving part is in its closed position, and the valve core is pushing the locking rocker arm to enter the locking guide groove.
Figure 8:
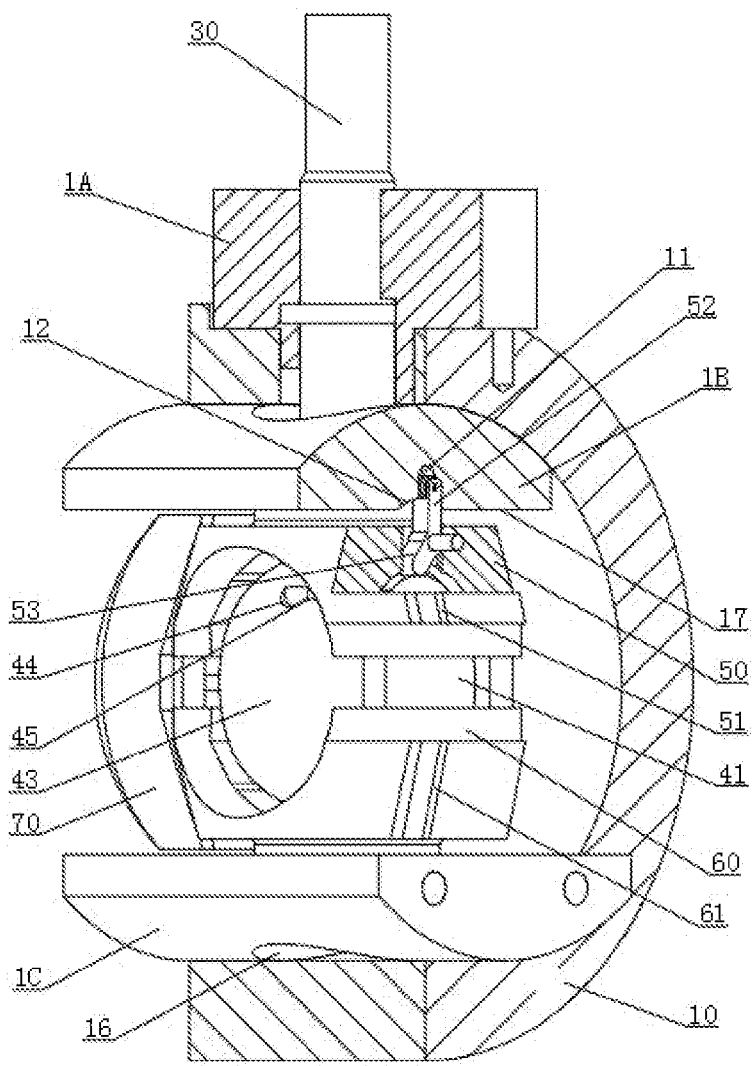
FIG. 8 is a structural diagram of the valve in the forced sealing state in an embodiment of the present disclosure. To show the state of the locking rocker arm, the front side of the sealing member is omitted.
Figure 9:
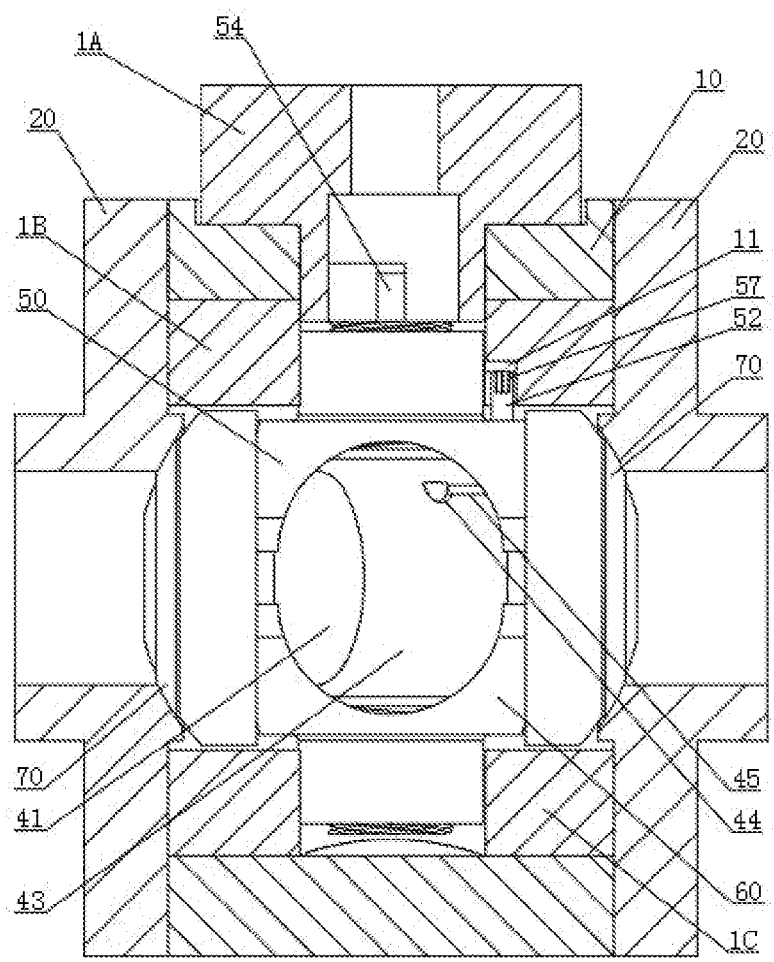
FIG. 9 is a side sectional view of the valve in the forced sealing state in an embodiment of the present disclosure.
Figure 10:
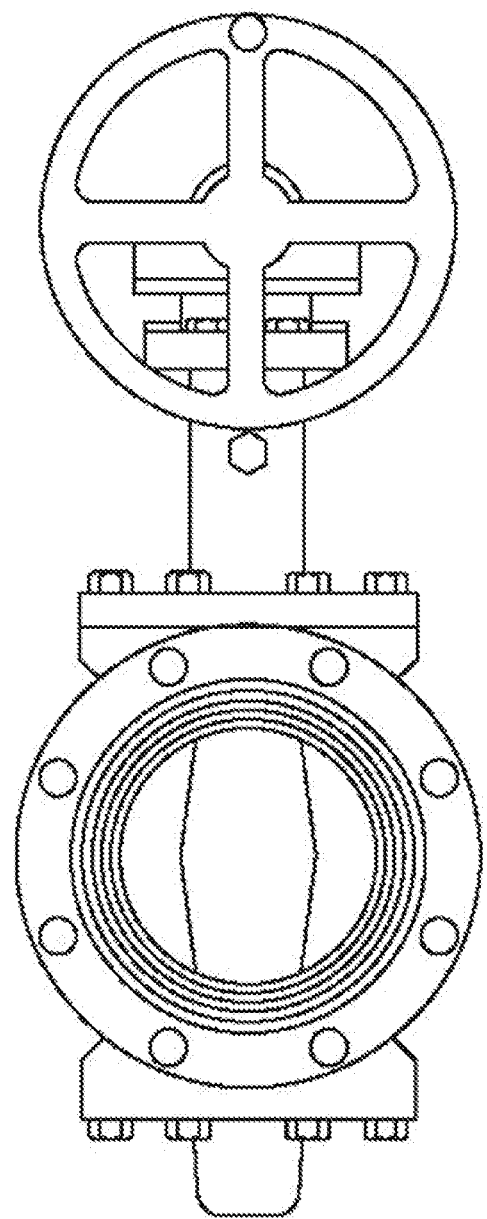
FIG. 10 is a schematic diagram of a DBB forced sealing valve in related technologies.

As shown in FIGS. 1-4, a DBB forced sealing valve operating device, the DBB forced sealing valve is provided with a valve body 10, a valve core 40 and an upper sealing member driving part 50. The valve core is provided with a flow passage 41. The above-mentioned upper sealing member driving part rotates between the open position (as shown in FIG. 4) and the closed position (as shown in FIG. 1). The valve core drives the upper sealing member driving part to rotate. The upper sealing member driving part is provided with a locking rocker arm 52. The valve body is provided with a rocker arm base surface 17; the rocker arm base surface is provided with a locking guide groove 11. The valve body is provided with an open stop and closed stop. When the upper sealing member driving part rotates to the closed position, the valve core pushes the locking rocker arm into the locking guide groove (as shown in FIG. 7), and the valve core continues to rotate in the closing direction (i.e., the R2 direction in FIG. 4) to drive the upper sealing member driving part to move along the rotation axis of the valve core. The locking rocker arm moves in the locking guide groove (as shown in FIGS. 8 and 9).

The locking rocker arm is provided with a rotating rocker 53. The valve core is provided with a rocker guide groove 44 and a rocker guide surface 45. When the upper sealing member driving part rotates between the open position and the closed position (as shown in the FIGS. 5 and 6), the rotating rocker is embedded in the rocker guide groove. The locking rocker arm moves under the restriction of the base surface of the rocker arm, and the valve core drives the upper sealing member driving part to rotate. When the upper sealing member driving part rotates to the closed position, the rocker guide groove pushes the locking rocker arm to rotate using the rotating rocker, the locking rocker arm enters the locking guide groove, and the rotating rocker moves on the rocker guide surface.

The rocker guide groove is provided at the starting end of the rocker guide surface. When the valve core rotates in the opening direction (i.e., the R1 direction in FIG. 4), the rocker guide groove pushes the rotating rocker, and the locking rocker arm moves away from the locking guide groove.

The opening of the locking guide groove is provided with a transition groove 12, and in some working conditions, when the upper sealing member driving part rotates to the closed position, the locking rocker arm enters the locking guide groove through the transition groove.

Embodiment One

As shown in FIGS. 1 to 4, a DBB forced sealing valve includes a valve body 10, a valve seat 20 and a valve stem 30.

The valve body described in this disclosure is a valve body of a broad concept, including a valve body 10. The valve body is cylindrical. A valve bonnet 1A is provided on the upper side of the valve body. The valve bonnet and the valve body are provided with a through shaft hole 14. The valve stem is installed in the shaft hole. An upper bearing block 1B is provided on the upper side of the valve body, and a lower bearing block 1C is provided on the lower side of the valve body. The upper bearing block and the lower bearing block are respectively provided with bearing holes (15, 16). The valve body 10, the valve bonnet 1A, the upper bearing block 1B and the lower bearing block 1C are fixedly connected as a whole to form a generalized valve body.

Sealing ring 32 is provided between the valve stem and the valve bonnet.

Either end of the valve body is respectively provided with a generalized valve seat 20 (a valve seat in this embodiment is an assembly of a valve seat and a valve end).

A valve core 40 is installed in the valve body. The valve core is installed in the valve body through the bearing hole of the upper bearing block 1B and that of the lower bearing block 1C. A valve core ball 43 is provided at the center of the valve core. A flow passage 41 is provided at the center of the valve core ball; the flow passage is a circular through hole and the diameter D of the flow passage is identical to the diameter of the pipe on which the DBB forced sealing valve is installed such that the medium in the pipe can flow smoothly. The upper end of the valve core ball is provided with an upper drive shaft 47, and the lower end of the valve core ball is provided with a lower drive shaft 48. The upper drive shaft and the lower drive shaft are provided with threads, and the threads direction of the upper drive shaft is opposite to that of the lower drive shaft. An inner hexagonal hole 46 is provided at the top of the upper drive shaft. A hexagonal head 31 corresponding to the inner hexagonal hole of the valve core is provided on the lower end of the valve stem. The valve stem drives the valve core 40 to rotate via the hexagonal head; the valve stem can also drive the valve core via other driving connections.

An upper sealing member driving part 50 and a lower sealing member driving part 60 are respectively provided on either side of the flow passage of the valve core. The upper sealing member driving part is provided with a threaded hole 55 to be meshed with the threads of the upper drive shaft of the valve core. The lower sealing member driving part is provided with a threaded hole 62 to be meshed with the threads of the lower drive shaft of the valve core. The lower sealing member driving part is provided with four guide holes 63, and the upper sealing member driving part is provided with four guide rods 56 corresponding to the guide holes so that the upper sealing member driving part and the lower sealing member driving part can move coaxially and synchronously. The valve core drives the upper sealing member driving part and the lower sealing member driving part to move in opposite directions using threads.

Either side of the upper sealing member driving part is provided with an upper driving track 51 for driving the sealing members. The upper driving track is inclined to the rotation axis of the valve core at its upper end; the angle between the upper driving track and the rotation axis of the valve core is $\alpha1$. Either side of the lower sealing member driving part is provided with a lower driving track 61 for driving the sealing members. The lower driving track is inclined to the rotation axis of the valve core at its lower end; the angle between the lower driving track and the rotation axis of the valve core is $\alpha2$. In this embodiment, $\alpha1=\alpha2$.

It is also possible to adopt a scheme in which the thread pitch of the upper driving shaft differs from that of the lower driving shaft and $\alpha1$ differs from $\alpha2$ to realize the function of synchronously pushing out the sealing members.

The upper sealing member driving part and the lower sealing member driving part are respectively provided with a sealing member 70 on either side. The sealing members are provided with an upper guide groove 71 to be matched with the upper driving track 51, and a lower guide groove 72 to be matched with the lower driving track 61.

When the valve core rotates, it drives the upper sealing member driving part and the lower sealing member driving part to move along the rotation axis of the valve core in opposite directions. During the valve closing operation, the upper sealing member driving part and the lower sealing member driving part move away from the flow passage. The upper sealing member driving part and the lower sealing member driving part drive the sealing members to move outward, pressing against the valve seats. During the valve opening operation, the upper sealing member driving part and the lower sealing member driving part move towards the flow passage. The upper sealing member driving part and the lower sealing member driving part drive the sealing members to retract from the valve seats.

There are various profiles that the upper driving track and the lower driving track can adopt, such as rectangular tracks, T-shaped tracks, cylindrical tracks, etc. This embodiment adopts dovetail tracks, which are compact and provide stable transmission.

The DBB forced sealing valve of this embodiment retains the excellent sealing performance of the DBB forced sealing valves currently in the market. It provides a round passage for the medium in the valve. The diameter of the medium passage is identical to the diameter of the pipeline, allowing smooth flow of the medium. The upper sealing member driving part and the lower sealing member driving part drive the motion and the forced sealing of the sealing members via a two-way slope. This effectively reduces the structural size of the valve and is suitable for various pipeline installation occasions.

Embodiment Two

As shown in FIGS. 1 to 4, a DBB forced sealing valve operating device, the operating device of this embodiment is the operating device of the DBB forced sealing valve described in the first embodiment.

As described in the first embodiment, the forced sealing valve is provided with a valve body 10, a rotatable valve core 40 and an upper sealing member driving part 50. The valve core is provided with a flow passage 41, and the valve core drives the upper sealing member driving part to rotate between the open position (shown in FIG. 4) and the closed position (shown in FIG. 1). When the valve core rotates relative to the upper sealing member driving part, it drives the upper sealing member driving part via the thread to make the sealing member move along the axis of rotation of the valve core, so that the sealing member moves towards or retracts from the valve seat, realizing the forced sealing or opening of the valve.

The DBB forced sealing valve requires a set of operating mechanism. During the closing operation, the valve stem in a one-way rotation stroke drives the sealing member to rotate 90° to reach its closed position and achieves forced sealing. During the opening operation, the valve stem in a one-way rotation stroke lifts the sealing of the sealing member and drives the sealing member to rotate 90° to reach its open position.

As the operating device of the DBB forced sealing valve, the upper sealing member driving part is provided with a locking rocker arm 52; the axis of rotation of the locking rocker arm is perpendicular to the axis of rotation of the valve core. The locking rocker arm is provided with a rotating rocker 53. The bottom surface 17 of the upper bearing block 1B of the valve body is the rocker arm base surface; the rocker arm base surface is provided with a locking guide groove 11 and an arc-shaped transition groove 12 is provided at the opening of the locking guide groove. The valve core ball 43 is provided with a rocker guide groove 44 and a rocker guide surface 45, and the rocker guide surface is a spiral surface surrounding the valve core ball. The rocker guide groove is arranged at the starting end of the rocker guide surface, and this starting end refers to the front end of the valve core when the valve core rotates in the closing direction.

The upper sealing member driving part rotates between an open position and a closed position with a rotation stroke of 90°. To limit the rotation stroke of the upper sealing member driving part, as a part of the generalized valve body, the valve bonnet 1A is provided with a limit groove 13, and the upper sealing member driving part is provided with a limit rod 54 which corresponds to the limit groove 13. The limit groove and the limit rod limit the rotation stroke of the upper sealing member driving part.

Other strategies for controlling the rotation stroke can also be adopted, such as controlling the rotation of the lower valve sealing member drive part or controlling the rotation of the sealing member.

Figure 5:
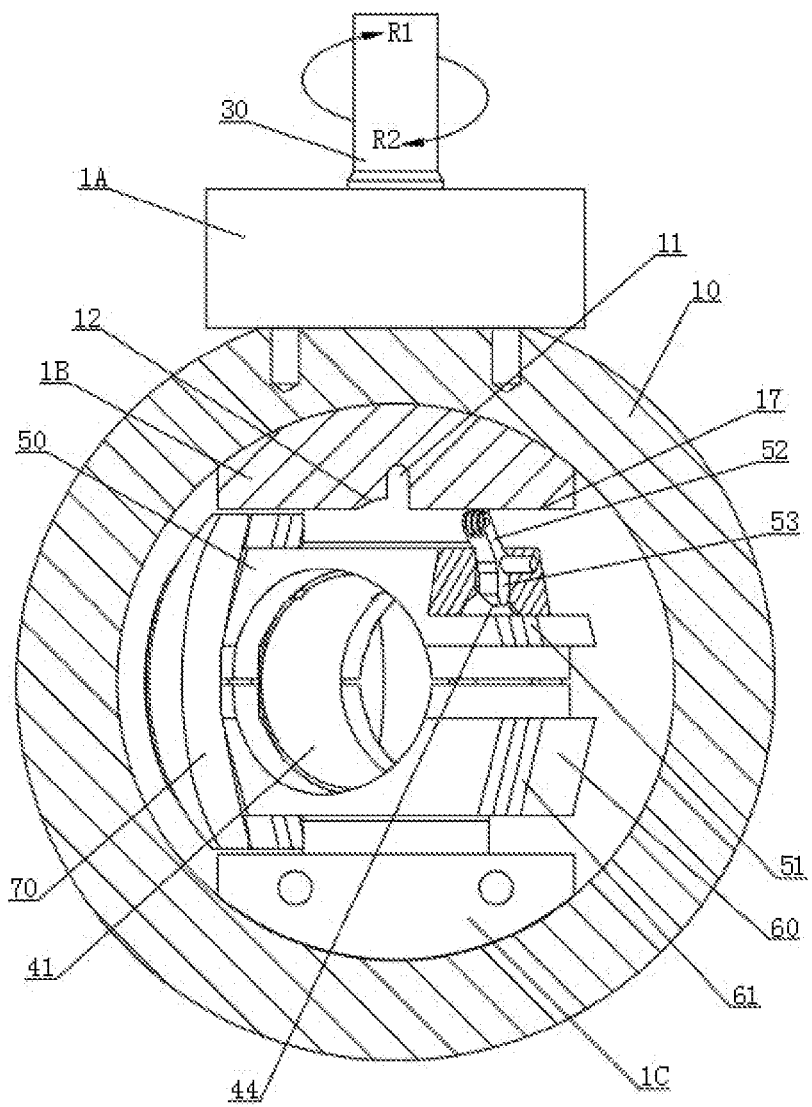
FIG. 5 is an axial view of the valve body in an embodiment of the present disclosure. The valve seats are omitted, and the upper sealing member driving part is in the middle of its rotation between its open position and closed position.
Figure 6:
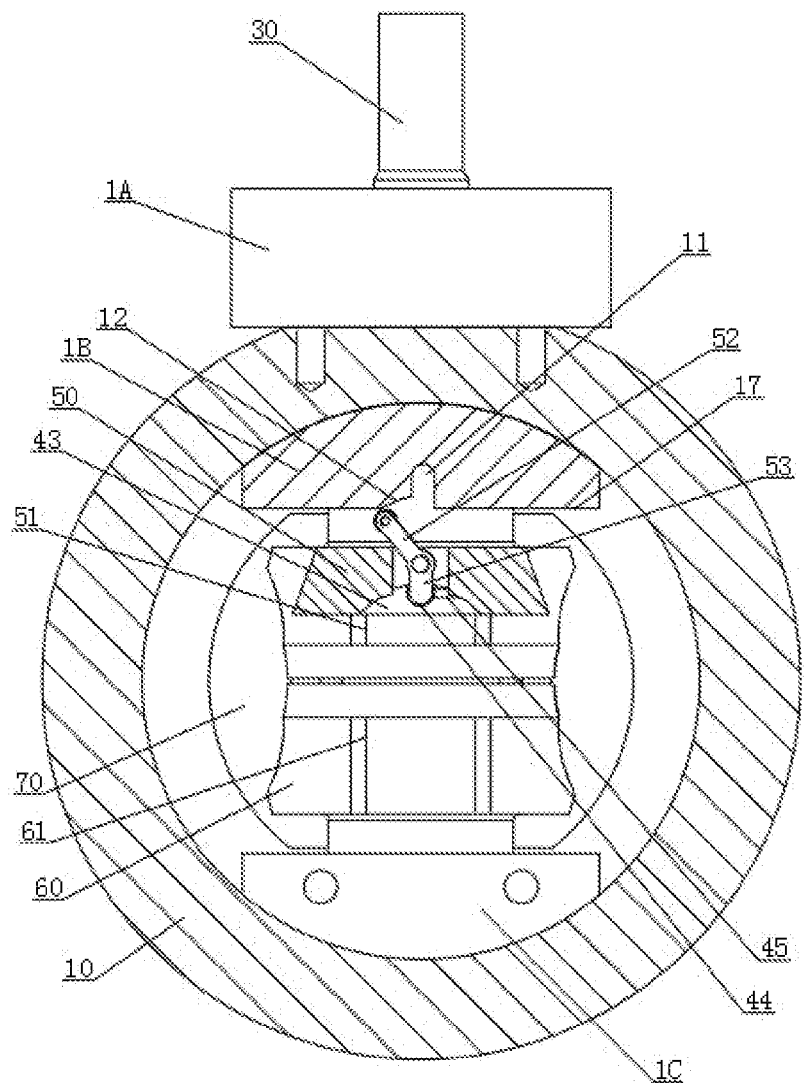
FIG. 6 is an axial view of the valve body in an embodiment of the present disclosure. The valve seats are omitted, and the upper sealing member driving part is in its closed position.

When the DBB forced sealing valve is in the open position, as shown in FIG. 4, the flow passage 41 of the valve core is aligned with the valve seats at both ends. When the upper sealing member driving part rotates between the open position and the closed position (as shown in FIGS. 5 and 6), the rotating rocker 53 of the locking rocker arm is embedded in the rocker guide groove 44. At this moment, the locking rocker arm rotates below the rocker arm base surface, that is, the top end of the locking rocker arm rotates below the base surface 17 or is in sliding contact with the base surface 17; the valve core drives the upper sealing member driving part to rotate and it also drives the lower sealing member driving part and the sealing member to rotate synchronously.

During the closing operation of the valve, the valve stem drives the valve core to rotate in the closing direction (R2 direction as shown in FIG. 4). When the upper sealing member driving part turns to the closed position, it stops rotating. The rocker guide groove 44 of the valve core pushes via the rotating rocker 53 the locking rocker arm 52 to rotate. The locking rocker arm enters the locking guide groove 11. The rotating rocker moves away from the rocker guide groove 44 (as shown in FIG. 7) and moves on the rocker guide surface 45. Under normal conditions, the upper sealing member driving part rotates freely with the valve core, and the locking rocker arm can also rotate freely with the upper sealing member driving part. The top end of the locking rocker arm does not contact the base surface 17 of the rocker arm. When the upper sealing member driving part turns to the closed position and stops rotating, the top end of the locking rocker arm has already passed the locking guide groove. The rocker guide groove 44 of the valve core pushes the rotating rocker 53, and the top end of the locking rocker arm 52 rotates along the transition groove 12 into the locking guide groove 11. However, under some working conditions, such as when the upper sealing member driving part is prevented from rotating freely due to the rotational resistance that the flow medium exerts on the upper sealing member driving part or due to the friction exerted by the bearing block on the upper sealing member driving part, the guide groove 44 will push the rotating rocker 53 to power the rotation of the upper sealing member driving part. At this moment, the top end of the locking rocker arm 52 is in sliding contact with the rocker arm base surface 17. To avoid excessive friction between the rocker arm and the rocker arm base surface, a rolling bearing 57 is provided at the top of the locking rocker arm in this embodiment. During such motion, due to the force provided by the rocker guide groove 44, the top of the locking rocker arm 52 can directly enter the locking guide groove 11.

The valve core continues to rotate in the closing direction (i.e., the R2 direction as shown in FIG. 4), and drives via the upper drive shaft 47 the upper sealing member driving part to move upwards along the valve core rotation axis. The locking rocker arm moves in the locking guide groove (as shown in FIGS. 8-9). At this moment, the valve core drives via the lower drive shaft 48 the lower sealing member driving part to move downwards along the valve core rotation axis. This achieves the mechanism described in the first embodiment: "the upper and lower sealing member driving parts move away from the flow passage. The upper and lower sealing member driving parts drive the sealing members to move outwards and to press against the valve seats to realize the forced sealing."

During the opening operation, the valve core rotates in the opening direction (i.e., the R1 direction in FIG. 4). Since the locking rocker arm 52 is in the locking guide groove 11, the position of the upper sealing member driving part is locked and so the upper sealing member driving part does not rotate with the valve core. The valve core simultaneously drives via the upper drive shaft 47 and the lower drive shaft 48 the upper and lower sealing member driving parts to move along the valve core rotation axis. This realizes the mechanism described in the first embodiment: "the upper and lower sealing member driving parts move towards the flow passage and drive the sealing members to retract from the valve seats." When the position of the rocker guide groove 44 matches the position of the transition groove 12 (as illustrated in FIG. 7), the rocker guide groove pushes the rocker. The locking rocker arm leaves the locking guide groove (as illustrated in FIG. 6). The top of the locking rocker arm is lower than the rocker arm base surface 17. The locking rocker arm stops rotating when contacts the upper sealing member driving part. The valve core continues to rotate in the opening direction. The rocker guide groove drives via the rotating rocker the upper sealing member driving part to rotate along with the valve core to the open position (refer to FIG. 4).

The present disclosure adopts a mechanism where the valve core drives the rocker arm; this mechanism is compact in size, which makes the opening and closing operations of the valve convenient and reliable.

Figure 11:
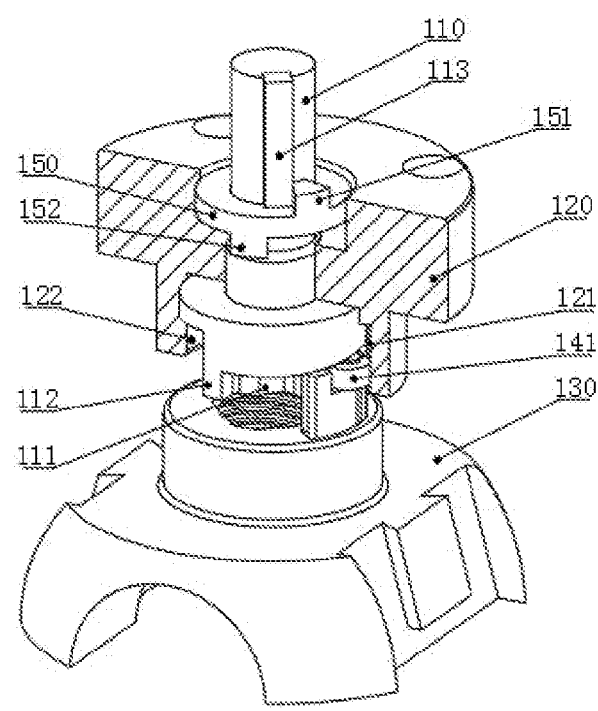
FIG. 11 is a structural diagram of the present invention.
Figure 12:
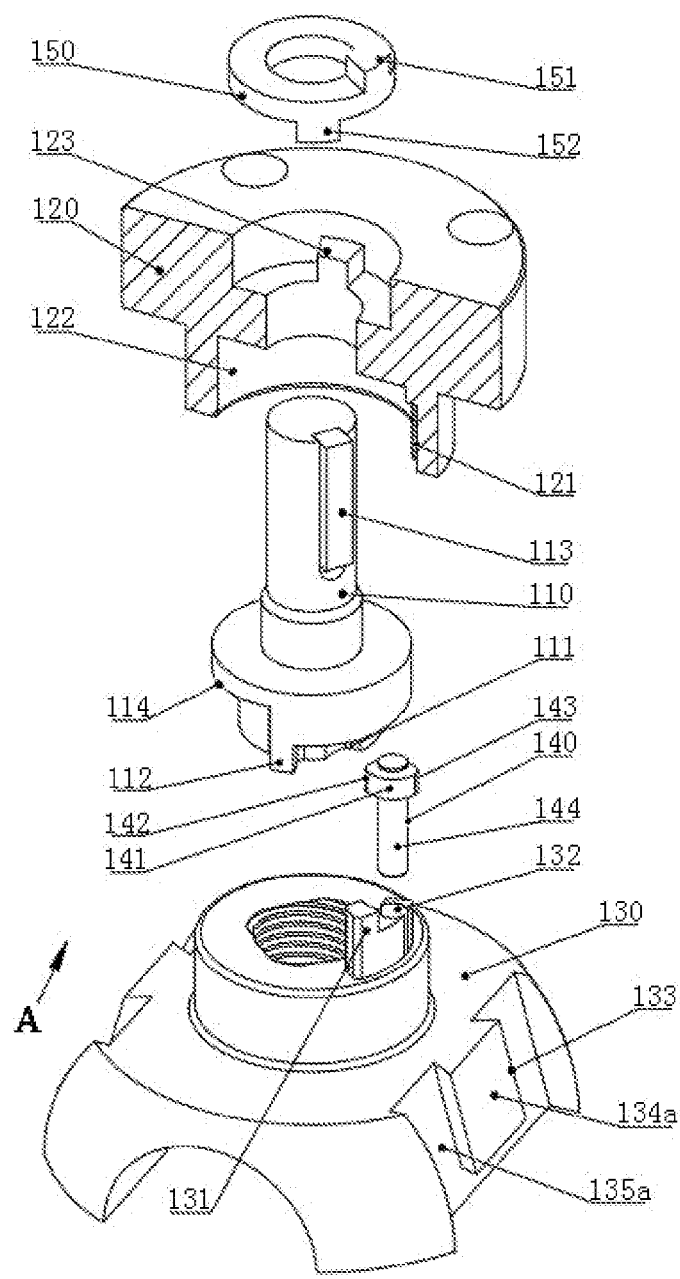
FIG. 12 is an exploded view of the structure of the present invention.
Figure 13:
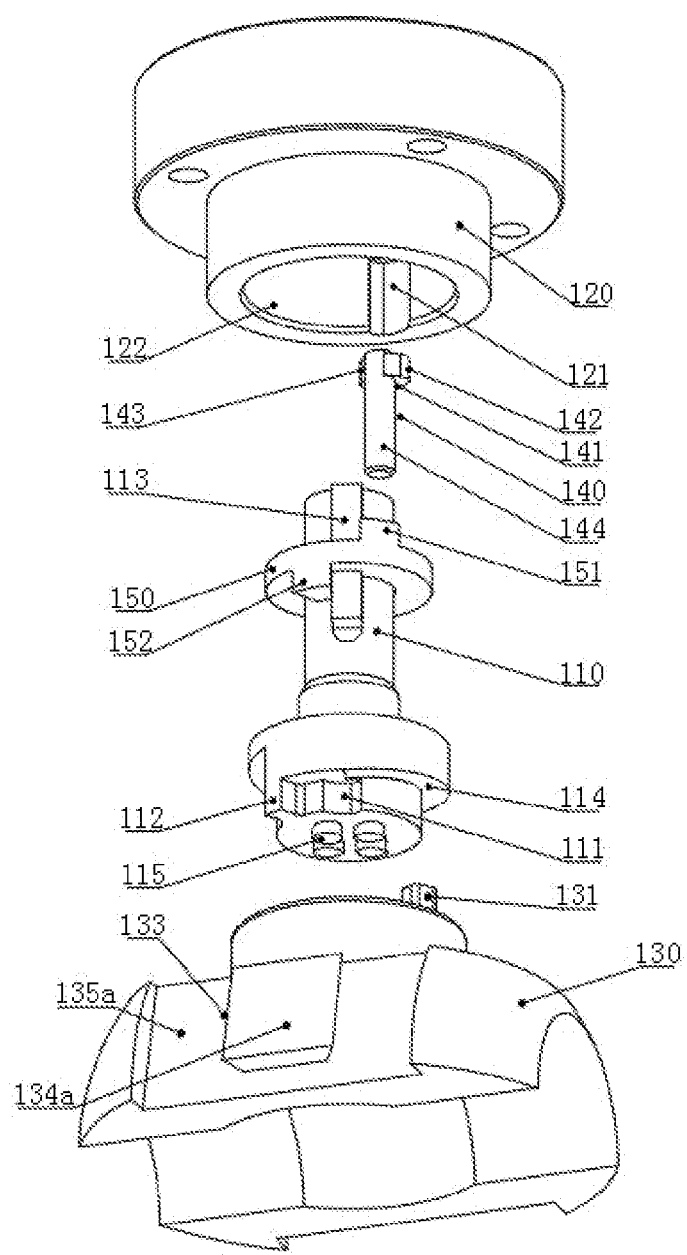
FIG. 13 is a view from the direction A of FIG. 2, which is viewed from the bottom side upward.
Figure 14:
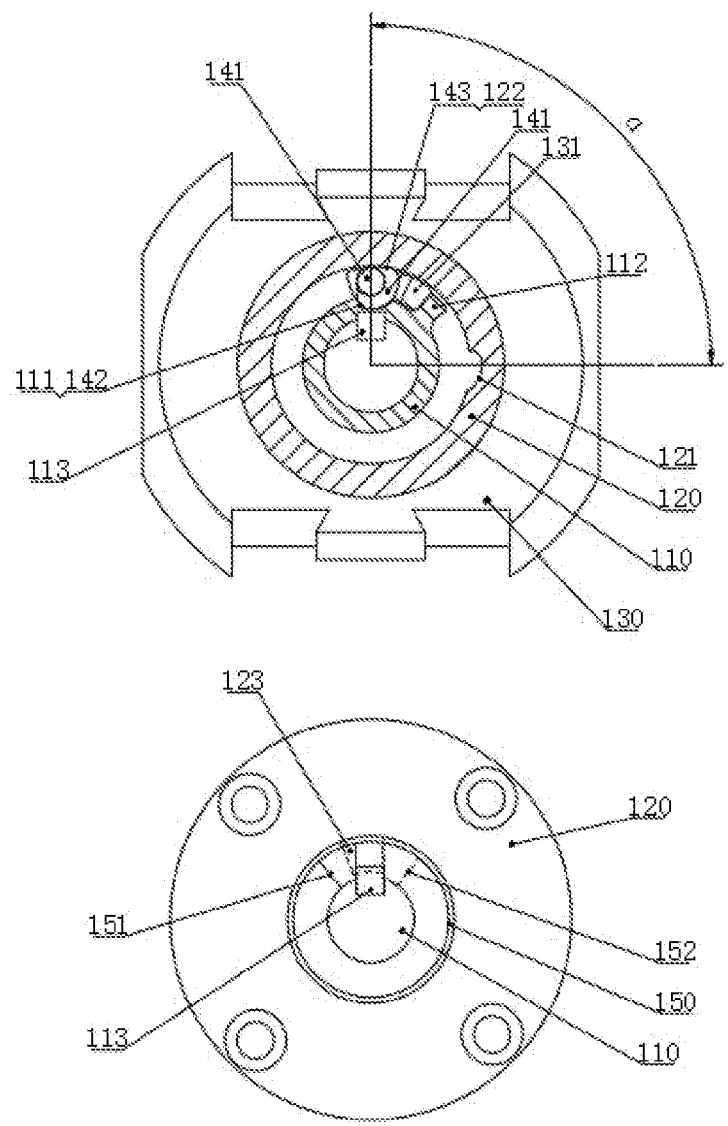
FIG. 14 is a schematic diagram for the structure and operating of present invention, comprising a valve stem (directly driving the valve core), the position for the base and the sealing member drive member and the position of the valve stem, the base and the position of the reverse limit ring, the sealing member drive member is in the reverse stroke end (i.e., the sealing member drive member on the valve open position), the reverse limit ring stops the valve stem from rotating in a reverse direction.
Figure 15:
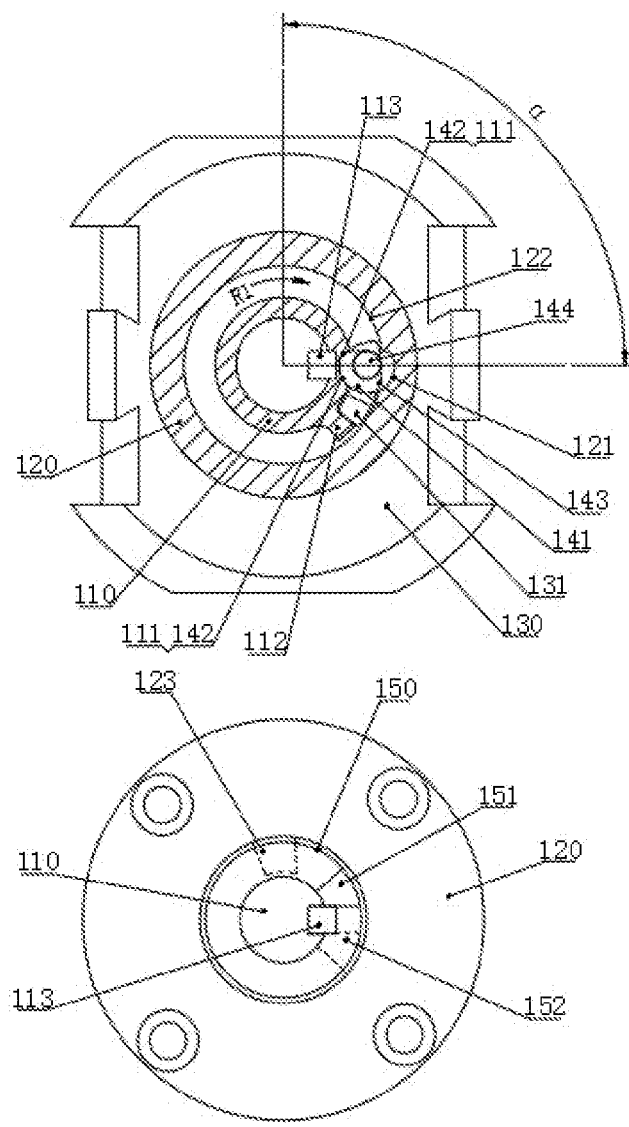
FIG. 15 is a schematic diagram for the structure and operating of the present invention, comprising a valve stem (it directly drives the valve core), the position for the base and the sealing member drive member and the position of the valve stem, the base and the position of the reverse limit ring, the sealing member drive member is in the forward stroke end (i.e., the sealing member drive member on the valve close position), the reverse limit ring is in a free rotation state.
Figure 16:
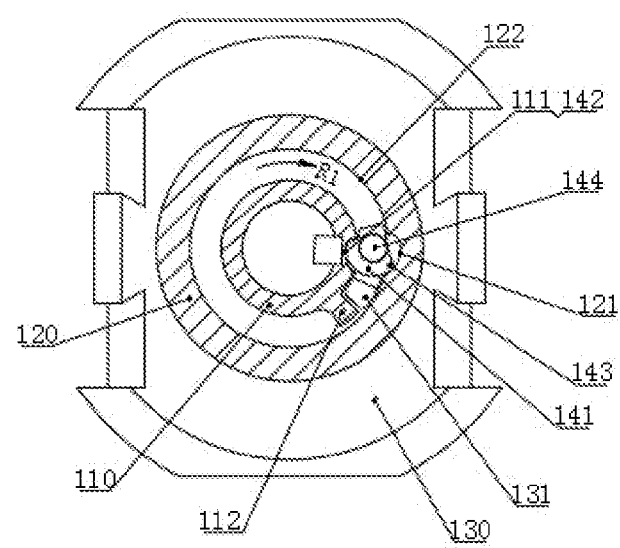
FIG. 16 is a schematic diagram for the structure and operating of the present invention, comprising a valve stem (directly driving the valve core), the position of the base and the sealing member drive member, the drive cam end of the lock pin embedded in drive groove of the base.

As shown in FIG. 11 to FIG. 13, a lock pin operating device, comprising a lock pin 140, the lock pin holding member 130, the lock pin driving member (110) and a base (120), the lock pin holding member (130) rotates back and forth in the set stroke (as shown in FIG. 14, FIG. 15 angle α); the lock pin includes a lock pin shaft (144) and a lock pin cam (141), the lock pin cam is provided a drive cam end (142) and a locking cam end (143), the lock pin is installed on the lock pin holding member, and the lock pin cam (141) is located between the lock pin driving member and the base; the lock pin driving member is provided with a driving groove (111) for accommodating the drive cam end, and the base is provided with a locking groove (121) for accommodating the locking cam end.

Figure 17:
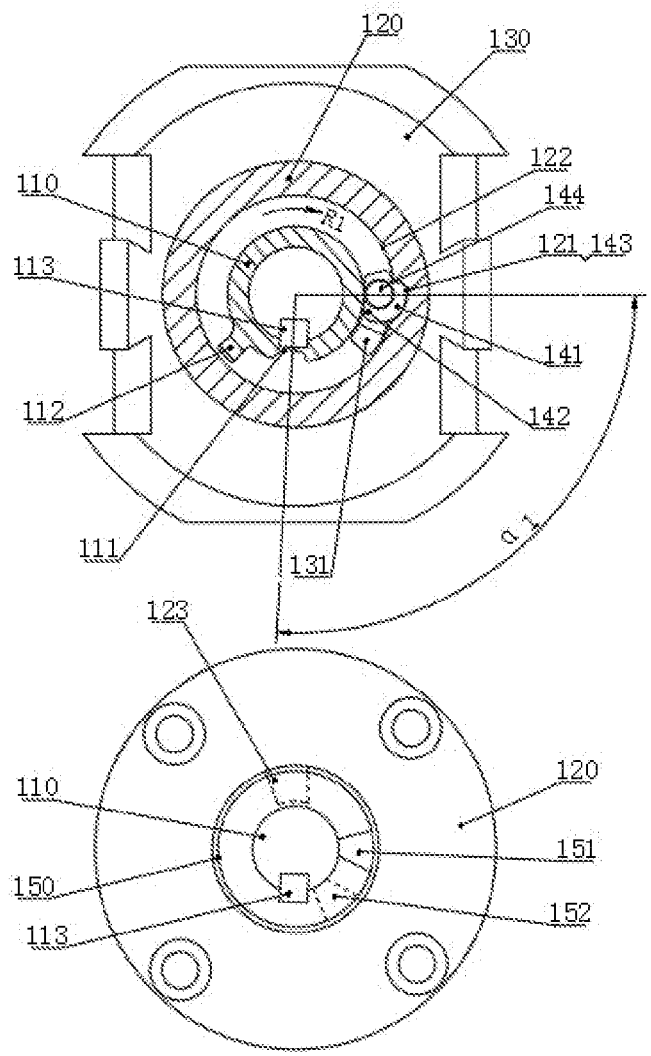
FIG. 17 is a schematic diagram for the structure and operating of the present invention, comprising a valve stem (directly driving the valve core), the position for the base and the sealing member drive member and the position of the valve stem, the base and the position of the reverse limit ring, the drive cam end of the lock pin come out of drive groove 111, the stem rotates to the forward direction relative to the sealing member drive member continuously, into the beyond-stroke, the reverse limit ring is in a free rotation state.

In the rotation stroke of the lock pin holding member, the drive cam end (142) of the cam is embedded in the driving groove (111), and the locking cam end (143) comes out of the locking groove (121); When the lock pin holding member rotates to the forward end of the rotation stroke, the locking cam end (143) is embedded into the locking groove (121), and the drive cam end (142) comes out from the driving groove (111), the lock pin holding member is locked, the lock pin driving member (110) is rotated relative to the lock pin holding member (130) (as shown in FIG. 17 angle α1).

An installation structure of the lock pin is that the lock pin holding member (130) is provided with a lock pin hole (132), and the lock pin shaft (144) is installed in the lock pin hole in a rotation fit; When the lock pin driving member (110) is rotated relative to the lock pin holding member, the lock pin holding member is driven by the lock pin driving member to move axially in a helical manner, the lock pin driving member is provided with a spiral surface (114), the helical screw lead of the spiral surface is the same as the helical screw lead of screw that the lock pin drive member to drive the lock pin holding member, the spiral surface stops the lock pin from coming out of said lock pin holes.

Another installation structure of the lock pin is that the upper end of the lock pin holding member (130) is provided with a lock pin block (135), the lock pin block is located between the lock pin driving member and the base, and the lock pin holding member is provided with a cam groove (136) and the lock pin cam (141) is arranged in the cam groove.

The base (120) is provided with a reverse stroke stop (123), the lock pin driving member (110) is provided with a key (113), and the lock pin driving member is equipped with a reverse limit ring 150. The reverse limit ring is rotationally matched with the lock pin driving member, and both ends of the reverse limit ring are respectively provided with a first shift block (151) and a second shift block (152), When the lock pin driving member rotates in the reverse direction, the key moves the first shifting block, and when the lock pin holding member (130) rotates to the reverse end of the rotation stroke, the reverse stroke limit block of the base stops the second shift block.

The upper end of lock pin holding member (130) is provided with a convex block (131); the lock pin driving member (110) is provided with actuation piece (112). When the lock pin drive member is reversely rotated, the actuation piece (112) drives the convex block (131).

Another structure in which the lock pin driving member drives the lock pin holding member to rotate in the reverse direction is that the lock pin operating device is provided with a screw driving member (170), and the screw driving member is provided with upper drive thread (173) for driving the lock pin holding member moving axially, the screw driving member is provided with a shift pin (175), the lock pin driving member (110) drives the screw driving member (170) to rotate synchronously, the lower portion of the lock pin holding member (130) is provided with the shift pin groove (137), the shift pin groove is provided with shift pin block (138); the screw driving member by a upper drive thread (173) drives the lock pin holding member moves axially. when the screw driving member (170) rotates reversely relative to the lock pin holding member (130), the shift pin (175) moves into the shift pin groove (137), and drives the shift pin block (138); when the screw driving member (170) rotates forwardly relative to the lock pin holding member (130), the shift pin (175) coming out of the shift pin groove (137) in the axial direction, stagger the rotation of the shift pin block (138).

Embodiment One

FIGS. 11 to 25, a lock pin operating device, comprising a locking pin (140), the lock pin holding member (130), the lock pin driving member (110) and a base (120).

The lock pin operating device is used for DBB forced sealing valve. The lock pin driving member (110) is the stem of the DBB forced sealing valve, the base (120) is the bonnet of the DBB forced sealing valve, and the lock pin holding member (130) is the upper sealing member drive member of the DBB forced sealing valve. The stem drives the valve core (170) to rotate synchronously, and the valve core acts as the screw driving member (170) to drive the upper sealing member drive member to move axially along the rotating shaft through threads.

DBB forced sealing valve further comprises a valve body (160), a lower sealing member drive member (162), an upper bearing block (163), a lower bearing block (167). The stem (110) passes through the valve bonnet (120) and connects to the valve core (170). The upper end of valve core is provided with four connecting pin holes (171), and the end of the valve stem is provided with four the drive pin (115) corresponding to the connecting pin holes (171), the valve stem is connected to the core through the drive pin (115) to drive the valve core to rotate synchronously. The upper bearing block is arranged on the upper side of the valve body, and the upper bearing block is provided with a bearing hole; the lower bearing block is arranged on the lower side of the valve body, and the lower bearing block is also provided with a bearing hole. The bearing hole of the upper bearing block is coaxial with the bearing hole of the lower bearing block. The upper sealing member drive member (130) is installed on the bearing hole of the upper bearing block, the upper sealing member drive member is able to rotate along the axis of the bearing hole of upper bearing block, and is able to move along the axis of the bearing hole of upper bearing block. The lower sealing member drive member is installed on the bearing hole of the lower bearing block. The lower sealing member drive member is able to rotate along the axis of the bearing hole of lower bearing block, and is able to move along the axis of the bearing hole of lower bearing block. The upper bearing block (163) and the lower bearing block (167) is provided with close positioning pin (166), the close positioning pin (166) stops the upper sealing member drive member (130) and the lower sealing member drive member (162) from rotating in the closed position of the valve.

As the structure of the DBB forced sealing valve, the center of the valve core is provided with a flow passage (172). The flow passage is a circular through hole. The diameter of the flow channel (D) is the same as the diameter of the pipe, so that through conduit is achieved. The upper end of the valve core is provided with an upper drive shaft, the upper drive shaft is provided with an upper drive thread (173), the lower end of the valve core is provided with a lower drive shaft, the lower drive shaft is provided with a lower drive thread (174), the upper drive thread and the lower drive thread are in the opposite direction.

The upper sealing member drive member (130) and the lower sealing member drive member (162) are respectively arranged on both sides of the flow passage of the valve core. The upper sealing member drive member and the lower sealing member drive member keeps synchronous rotation. When the valve core rotates relative to upper sealing member drive member (130) and the lower sealing member drive member (162), the valve core drives the upper sealing member drive member to move along the axis through the upper drive thread (173) and drives the lower sealing member drive member to move along the axis through the lower drive thread (174), and the upper sealing member drive member and the lower sealing member drive member moves in opposite direction.

The upper sealing member drive member and lower sealing member drive member drives the sealing members (164) to press against the valve seats (165).

On both sides of the upper sealing member drive member are respectively provided with upper track (133) for driving the sealing member (164), the drive track is inclined inward at the upper end of the valve core rotation axis. Both sides of the lower sealing member drive member are respectively provided with a lower track (162a) for driving the sealing member, and the lower drive track is inclined inward at the lower end of the valve core rotation axis. When the valve core rotates, the upper and lower sealing member drive member are driven to move in the opposite direction along the rotation axis of the valve core. When the upper and lower sealing member drive members move away from the flow passage, the upper sealing member drive member and the lower sealing member drive member drives the sealing members to press against the valve seats to achieve forced sealing. When the upper sealing member drive member and the lower sealing member drive member moves in the direction approaching the flow passage, the upper sealing member drive member and the lower sealing member drive member drives the sealing members to retract from the seats. The upper track and the drive track of this embodiment adopt a dovetail track, which has a relatively compact structure and a relatively stable transmission function.

The upper sealing member drive member 130 and lower sealing member drive member 162 include the upper track 133 and lower track 162a, which interface with the sealing members 164 via the pocket 176.

Specifically, the first inner flat bearing surface 134a and the second inner flat bearing surface 135a interface with the first outer flat bearing surface 177 and the second outer flat bearing surface 178, respectively.

As discussed above, the surfaces 134a/135a/177/178 are preferably flat, planar, and of consistent width. This creates an even and supported sliding motion, avoiding undesired rotation or instability.

Figure 25:
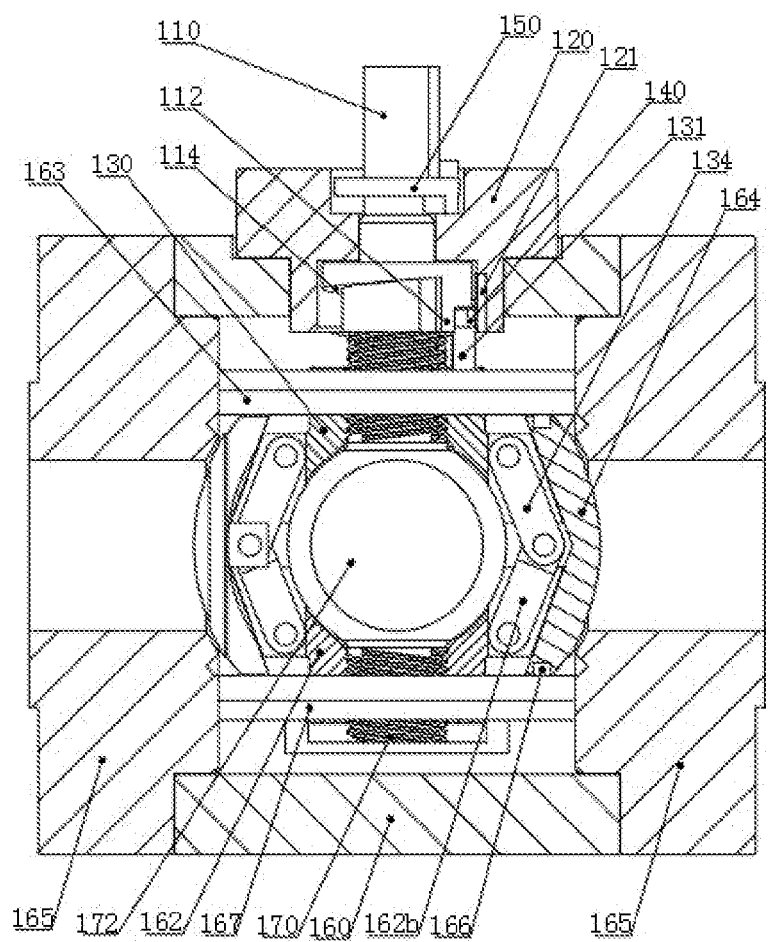
FIG. 25 is a structural diagram of a DBB forced sealing valve with link driving mechanism using the present invention.

As shown in FIG. 25, another DBB forced valve seal structure, the upper sealing member drive member is provided with upper drive rod (134), the lower sealing member drive member is provided with lower drive rod (162b), upper drive rod (134) and the lower drive rod (162b) are respectively hinged with the sealing member. When the valve core rotates, the upper and lower sealing member drive members are driven to move along the rotation axis of the valve core in the opposite direction. The difference from the above-mentioned DBB forced sealing valve is that upper drive rod and lower drive rod press the sealing members toward the seats to establish forced sealing when the upper sealing member drive member and the lower sealing member drive member moves toward the direction of flow passage. upper drive rod and lower drive rod pull the sealing members away from the seats when the upper sealing member drive member and the lower sealing member drive member move in the direction away from the flow passage.

In order to facilitate the operation of the valve, the DBB forced sealing valve requires that the opening or closing operation of the forced sealing valve can be completed in one rotation stroke of the valve stem. The stem drives the valve sealing members to rotate an angle (as shown in FIGS. 14 and 15 angle α) between the open position (FIG. 14 position) and closed position (FIG. 15 position), the stem will further rotate relative to the upper sealing member drive member in the closed position of the valve (as shown in FIG. 17), drive the upper sealing member drive member and the lower sealing member drive member to move along the valve stem axis. In order to achieve such function, this embodiment adopts a lock pin operating device.

The lock pin (140) is provided with a lock pin shaft (144), the lock pin is provided with detent cams (141), the lock cam pin is provided with a drive cam end (142) and a locking cam end (143).

The upper sealing member drive member (130) is provided with a convex block (131) and a lock pin hole (132). The convex block (131) protrudes from the upper end surface of the upper sealing member drive member. The lock pin shaft (144) of the lock pin (140) is mounted in the lock pin hole (132) of the lock pin holding member (130). The rotation axis of the lock pin (140) is parallel to the rotation axis of the valve stem.

A valve stem (110) is provided with the drive grooves (111) for receiving the drive cam end (142), the drive grooves (111) are arcuate grooves, corresponding to the shape of the drive cam end (142) of the cam (141). The valve stem is provided with an actuation piece (112), and the actuation piece (112) dials the convex block (131) of the upper sealing member drive member when the valve stem rotates reversely. The valve stem is also provided with a key (113).

Valve bonnet (120) (i.e., base) provided with a base hole (122), the base hole is provided with the locking groove (121) for accommodating the locking cam end (143). The valve bonnet is provided with a reverse stroke stop (123).

Stem (110) has a reverse limit ring (150), the reverse limit ring (150) can rotate against the stem, the both end of the reverse limit ring are provided with the first shift block (151) and the second shift block (152), when the valve stem rotates in the reverse direction (turning to the opening direction of the valve), the key (113) dials the first shift block, and the reverse stroke stop (123) of the valve bonnet blocks the second shift block and stops the valve stem from rotating in the valve opening position (the reverse stroke end of the upper sealing member drive member (130)). When the valve stem rotates in the forward direction (turning to the closing direction of the valve), the reverse stroke stop (123) will not block the rotation of the valve stem within a range close to 720°, and the valve stem can obtain sufficient stroke range relative to the upper sealing member drive member.

In the valve open state, the sealing member drive member (130) positioned in the open position (i.e., the reverse stroke end of the sealing member drive member (130)), the position of valve stem (110) and the upper sealing member drive member is as shown per FIG. 14. The drive cam end (142) of the lock pin cam is embedded in the drive groove (111) of the valve stem, and the locking cam end (143) of the lock pin cam is against the internal wall of the inner hole of the base.

During the closing operation of the valve, the valve stem (110) rotates to the closing direction (that is, the forward rotation R1), the lock pin locks the connection between the upper sealing member drive member and the valve stem within the rotation stroke of the upper sealing member drive member (130), and the valve stem (110), through the lock pin (140), drives the upper sealing member drive member (130) to rotate within the valve rotation stroke (as shown per FIGS. 14 and 15, angle α), the valve rotation stroke is the rotation stroke of the upper and lower sealing member drive members α=90° (also called the rotation stroke of the sealing member drive member), within the rotation stroke α, the locking cam end (143) of the lock pin cam moves along the inner wall of the base hole (122) of the valve bonnet.

As shown in FIG. 15, the upper sealing member drive member (130) rotates to the closed position (i.e., the forward end of the sealing member drive member (130)), the closing positioning pin (166) stops the upper sealing member drive member (130) from rotating, while the valve stem (110) continues to rotate to the closing direction, the drive groove (111) of the valve stem pushes the drive cam end (142) of the lock pin, the lock pin cam (141) rotates, and the locking cam end (143) of the lock pin cam embedded into locking groove (121) of bonnet (FIG. 16), the drive cam end (142) of the lock pin cam moves out from the drive groove (111) of the valve stem, valve stem can rotate to the forward direction relative to the upper sealing member drive member continuously (FIG. 17). Lock pin locks the connection between the upper sealing member drive member and the bonnet (120) while the stem rotates independently. In this case, the stem shaft surface can prevent the rotation of the locking pin cam. The locking cam end (143) of the locking pin cam cannot move out from the locking groove (121), so that the upper sealing member drive member (130) (including the lower sealing member drive member (162) cannot rotate in both opening and closing direction.

The stem (110) rotates independently over the forward stroke end of the upper sealing member drive member (130), as shown in FIG. 17, into the beyond-stroke α1. When stem rotates relative to the upper sealing member drive member, the valve core (170) also rotates relative to the sealing member drive member, the valve core (170) drives the upper and lower sealing member drive member to move along the axial direction of the stem via the upper drive thread (173) and lower drive thread (174), the upper sealing member drive member and the lower sealing member drive member drive the sealing members (164) to press against the seats, forced sealing is achieved.

Figure 18:
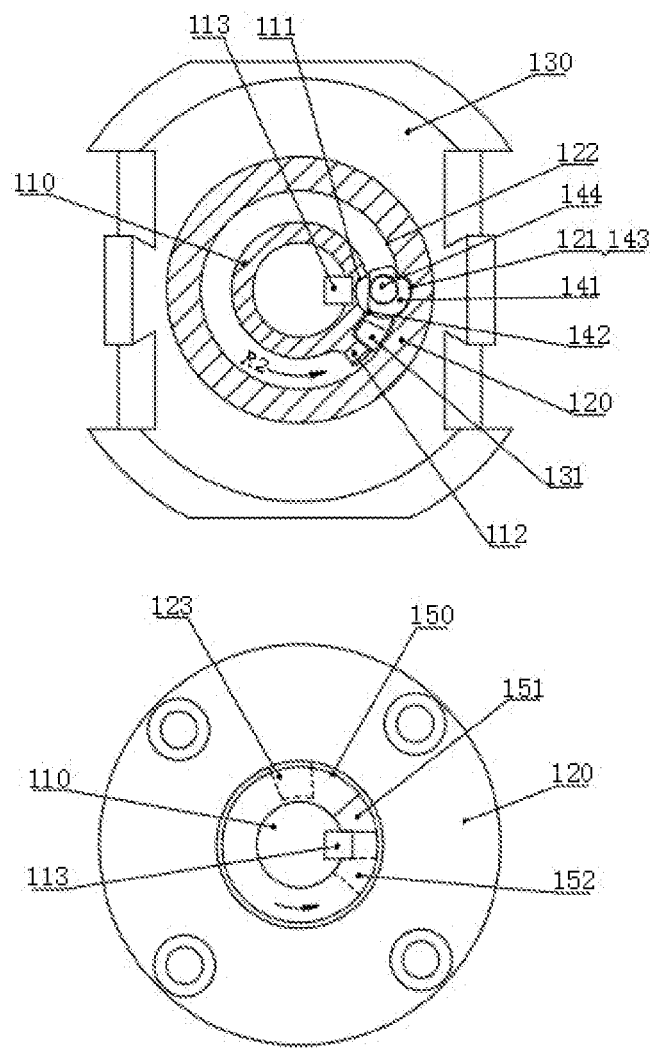
FIG. 18 is a schematic diagram for the structure and operating of the present invention, comprising a valve stem (directly driving the valve core), the position for the base and the sealing member drive member and the position of the valve stem, the base and the position of the reverse limit ring, the stem is rotating reversely, the open block of the stem contact the open bump of the sealing member drive member, open block drives the open bump toward reverse rotation direction, the driving groove of the stem is aligned to the position of the lock pin cam.
Figure 19:
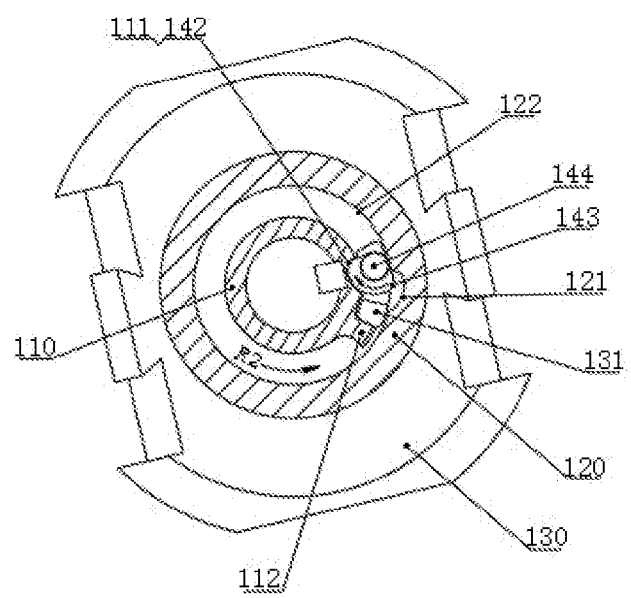
FIG. 19 is a schematic diagram for the structure and operating of the present invention, comprising a valve stem (directly driving the valve core), the position for the base and the sealing member drive member, the lock cam end come out of locking groove of base (bonnet), driving cam end embedded into driving groove of the stem.
Figure 20:
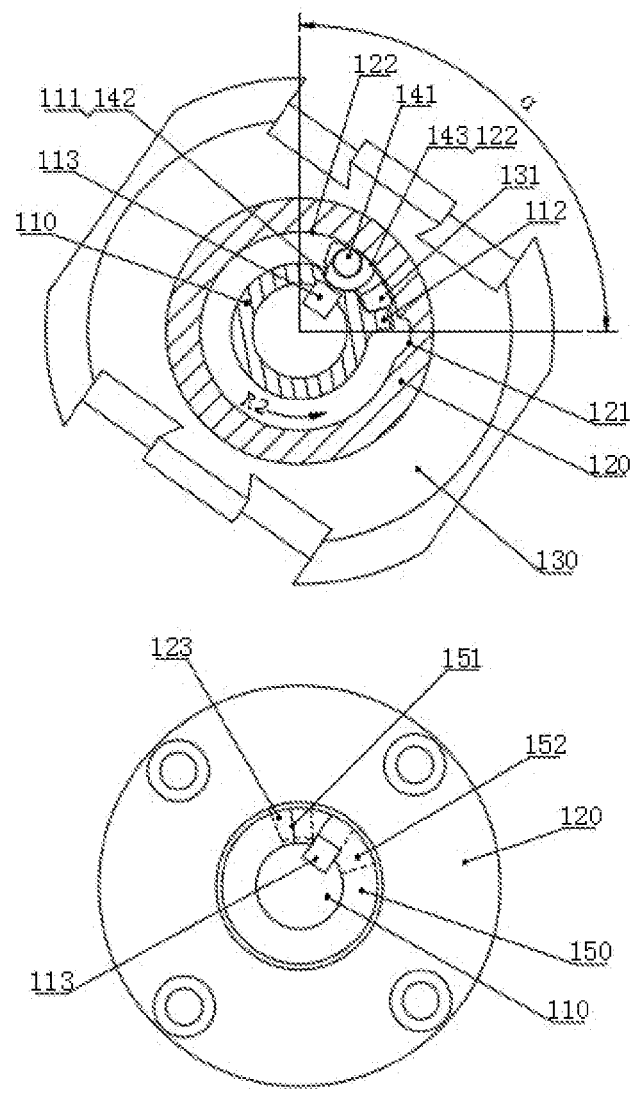
FIG. 20 is a schematic diagram for the structure and operating of the present invention, comprising a valve stem (directly driving the valve core), the position for the base and the sealing member drive member and the position of the valve stem, the base and the position of the reverse limit ring, the valve stem rotate forwardly the sealing member drive member through the lock pin, or the open block of the valve stem to drive the open bump of the sealing member drive member, so that the sealing member drive member rotates reversely.
Figure 21:
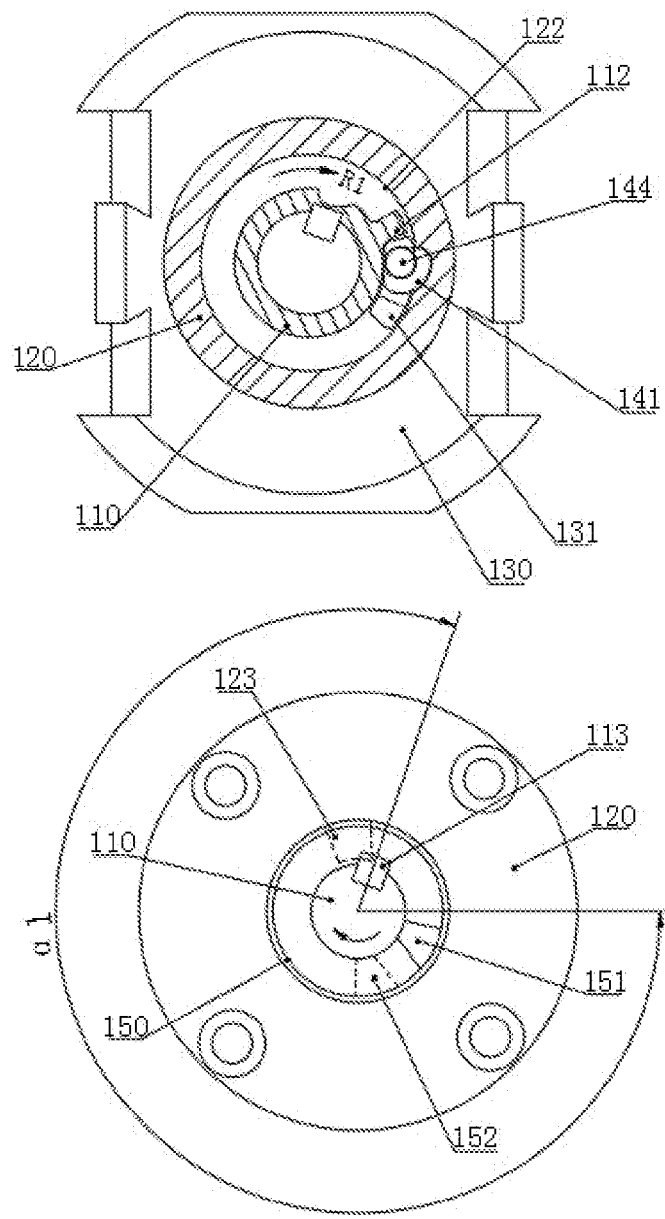
FIG. 21 is a schematic diagram for the structure and operating of the present invention, shows that the beyond-stroke of the valve core can be greater than 270°.
Figure 22:
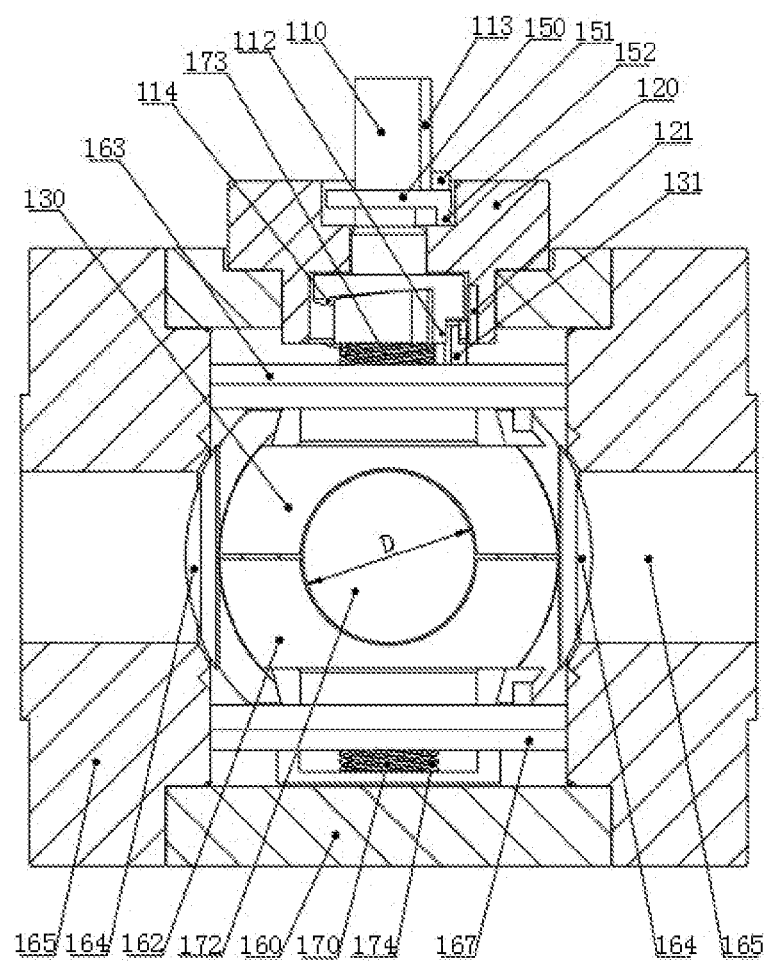
FIG. 22 is a cross-sectional view of a DBB forced sealing valve applying the present invention.
Figure 23:
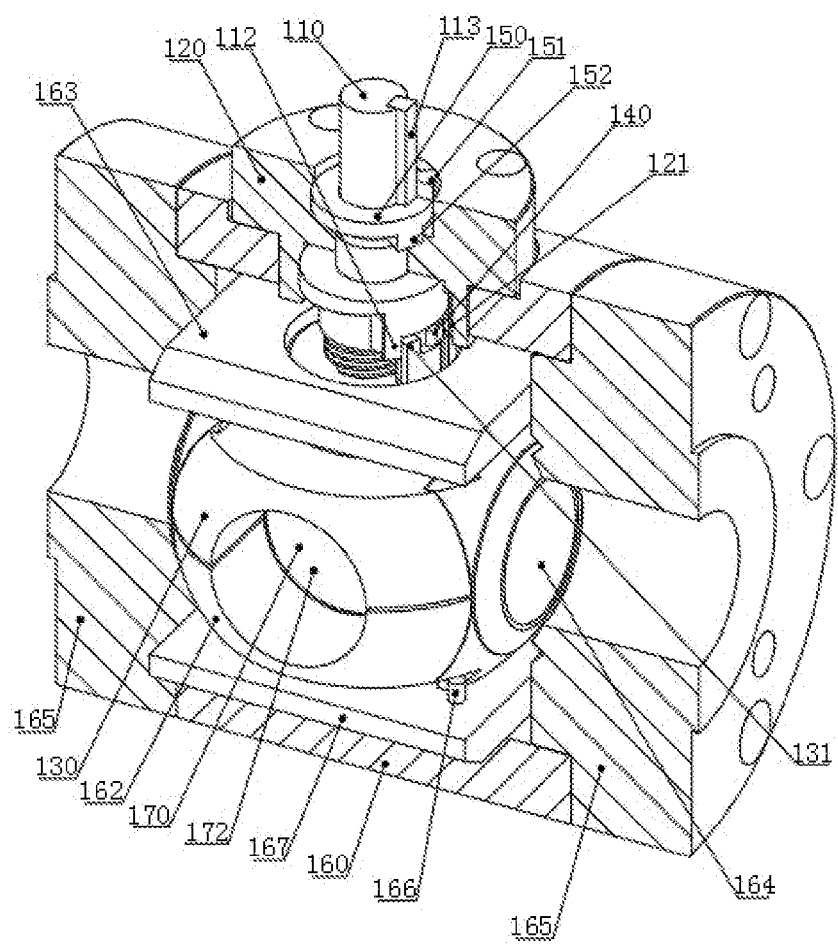
FIG. 23 is a structural diagram of a DBB forced sealing valve applying the present invention.
Figure 24:
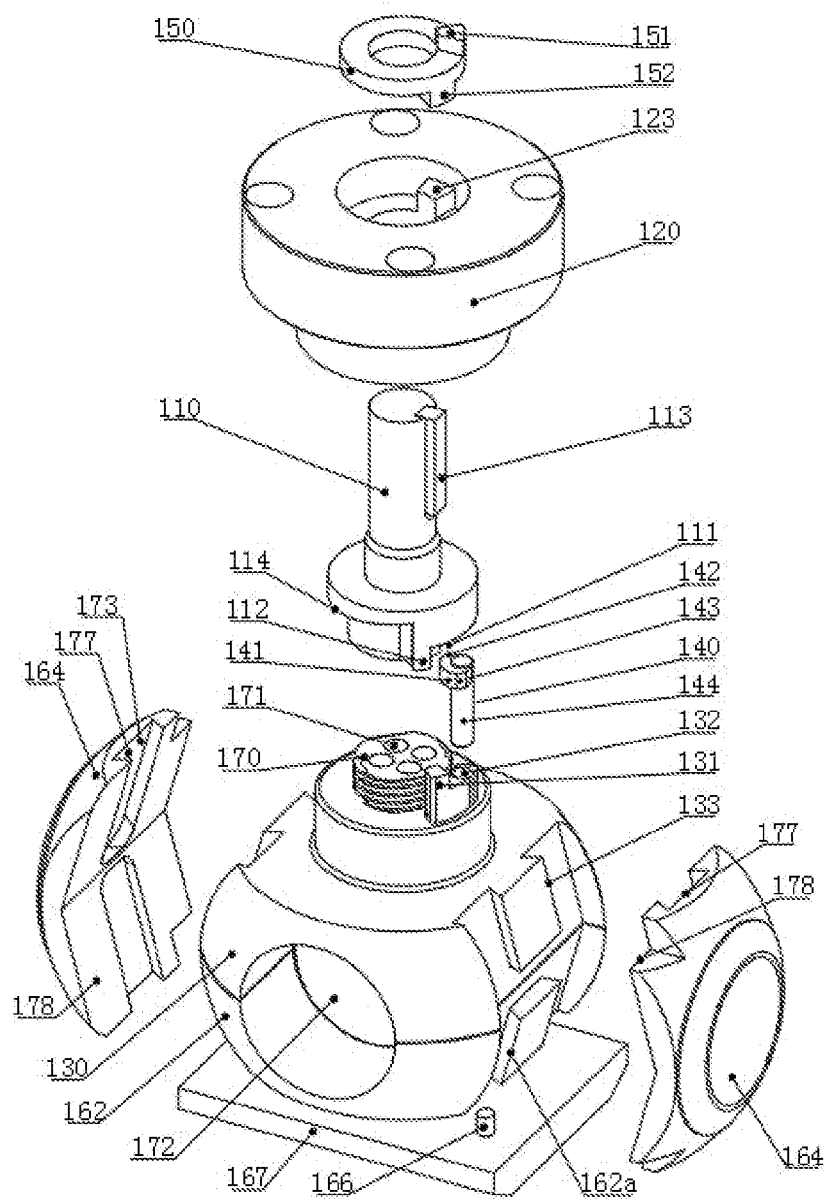
FIG. 24 is a structural diagram of the operating parts of the DBB forced sealing valve applying the present invention.

During the opening operation, the valve stem rotates to the opening direction (i.e., reverse stroke R2). The vale core (170) rotates relative to the upper sealing member drive member, the valve core (170) drives the upper and the lower sealing member drive members to move along the axial direction of the stem via the upper drive thread (173) and the lower drive thread (174), the upper sealing member drive member and the lower sealing member drive member drive the sealing members (164) to retract from the seats, forced sealing is released, contact and friction between the sealing members and seats are avoided. As shown in FIG. 18, the actuation piece (112) of the stem contacts convex block (131) of the upper sealing member drive member when the valve stem rotates to the position that the drive grooves (111) is aligning to the lock pin (140), the actuation piece (112) dials the convex block (131) reversely, drives the upper sealing member drive member to rotate toward opening direction. Upper sealing member drive member drives the lock pin (140) to move, the lock pin cam (141) start to rotate, the locking cam end (143) comes out of the locking groove (121) of the valve bonnet. The drive cam end (142) embedded in the drive grooves (111) of the valve stem, as shown in FIG. 19. Valve stem (110) rotates in the reverse direction, the actuation piece (112) of stem dials convex block (131) of the upper sealing member drive member, so that the upper sealing member drive member (130) rotates to the opening direction (as shown in FIG. 20). Until it rotates to the open position of the upper sealing member drive member (130) (the position shown in FIG. 14), the reverse stroke stop (123) of the valve bonnet blocks the second shift block of the reverse limit ring (150) stops the rotating of the stem, the upper sealing member drive member and the lower sealing member drive member also stop rotating and stay at the open position. At this time, the flow passage (172) of the valve core aligns the valve seats, and the valve is in open position.

The valve stem (110) is provided with a spiral surface (114), the screw lead of the spiral surface is the same as the screw lead of the upper drive thread (173), the spiral surface faces the extending end of the locking pin (140), stops the lock pin shaft (144) from coming out of the locking pin hole (132). Since the upper sealing member drive member moves along axially when stem rotates against the upper sealing member drive member, valve stem relative to the valve plate drive member is rotated, the spiral surface can constrain the relative position of the lock pin to the upper sealing member drive member, i.e., to prevent the lock pin shaft (144) coming out of the upper sealing member drive member.

The reverse limit ring (150) can increase the beyond-stroke of the valve stem (that is, the stem rotational stroke relative to the upper sealing member drive member). Without reverse limit ring (150), the valve stem key directly contacts the reverse stroke stop of the bonnet, and the beyond-stroke of the valve stem will not exceed 270°, which makes the design of the valve core and the upper sealing member drive member very challenge. The reverse limit ring structure of the present invention can make the beyond-stroke a1 of the valve stem exceed 270°, which can meet the design requirements, and improve the operating performance.

Embodiment Two

Figure 26:
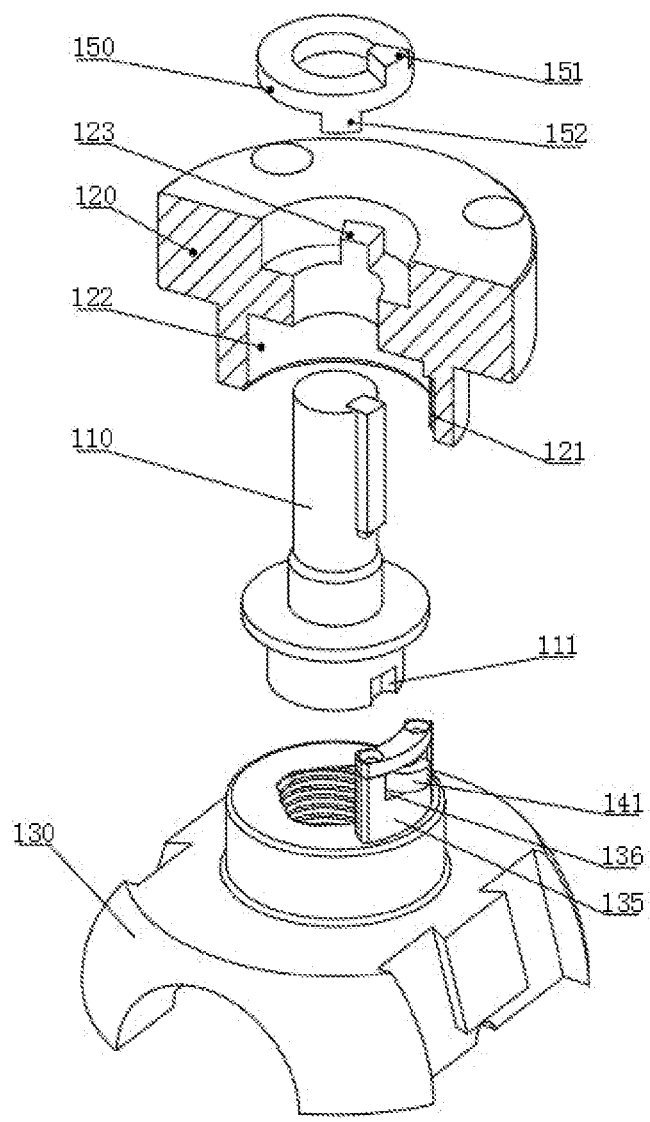
FIG. 26 is a structural diagram of the lock pin holding member of the present invention provided with a cam groove.
Figure 27:
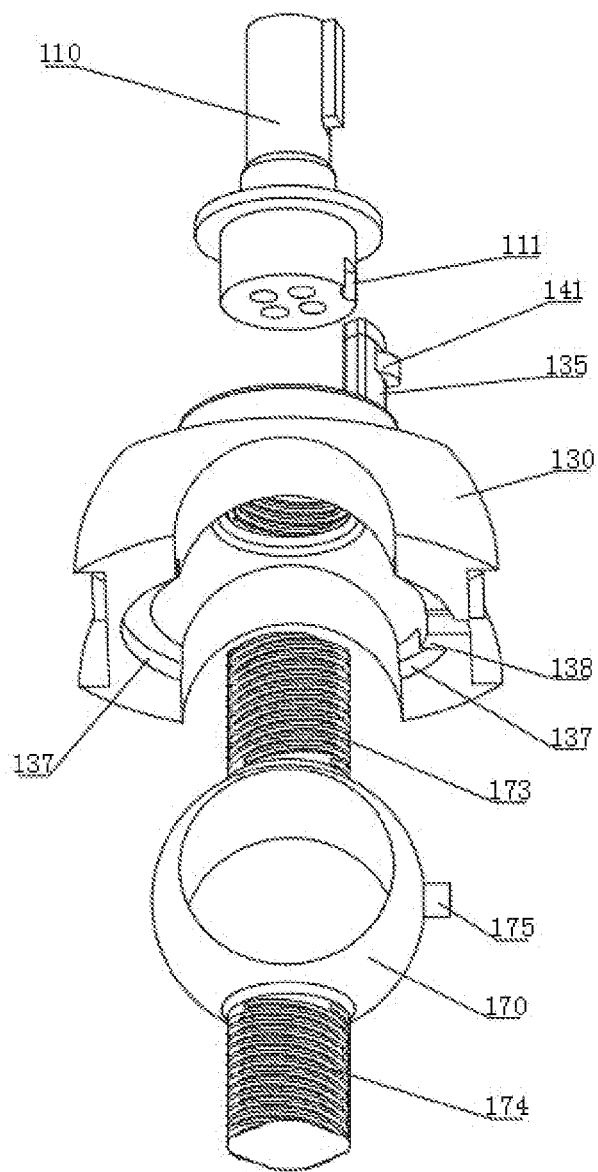
FIG. 27 is a structural diagram of a shift pin groove (137) provided on the lower part of the lock pin holding member of the present invention, and a shift pin is provided on the screw driving member.

A lock pin operating device as shown in FIG. 26 and FIG. 27, This embodiment is an improvement of the first embodiment.

Figure 28:
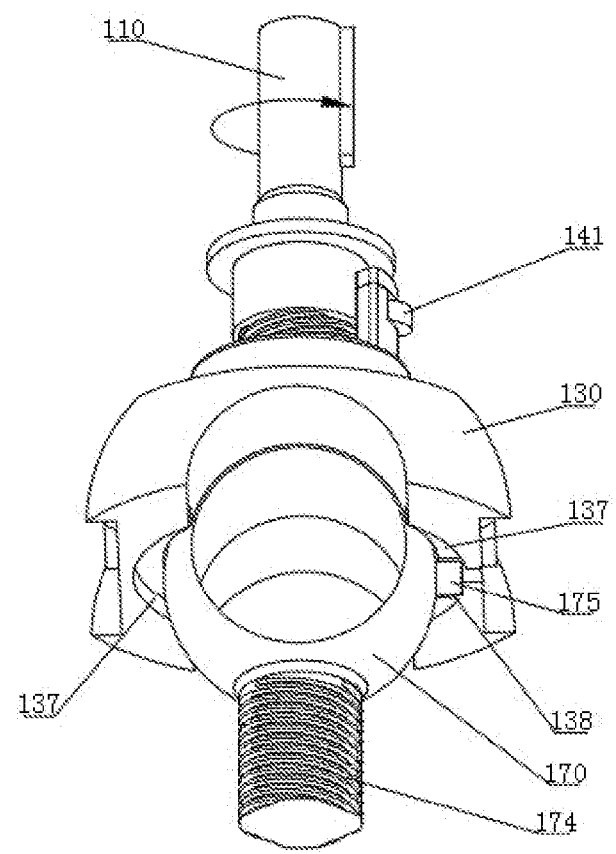
FIG. 28 is a schematic diagram of the shift pin shifting the shift pin stop when the valve core of the present invention rotates reversely against the sealing member drive member.
Figure 29:
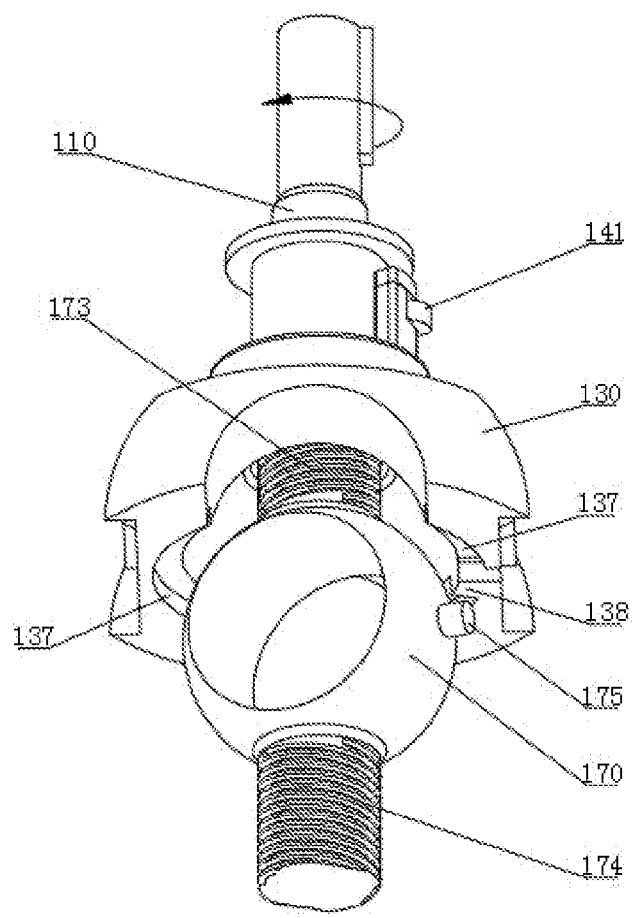
FIG. 29 is a schematic diagram of the shift pin protruding out of the shift pin groove in the axial direction when the valve core of the present invention rotates forwardly relative to the upper sealing member drive member.

In order to further increase the beyond-stroke of the valve stem (that is, the rotation stroke of the valve stem relative to the upper sealing member drive member), in this embodiment, the lock pin operating device is provided with a valve core (170), the valve core is provided with upper drive thread (173) for driving the upper sealing member drive member (130) axially movable, the valve core (170) is also provided with a shift pin (175), the valve core (170) is driven by the stem (110) to rotate synchronously, the lower portion of the upper sealing member drive member (130) is provided with the shift pin groove (137), the shift pin groove is provided with shift pin block (138); the valve stem (110) drives the upper sealing member drive member (130) via upper drive thread (173) to move axially. When valve core (170) rotates reversely against the upper sealing member drive member (130) (as shown in FIG. 28), the shift pin (175) enters into the shift pin groove (137), and dials the shift pin block (138), so that the valve stem drives the upper sealing member drive member to rotate to the opening direction. When valve core (170) rotates forwardly against the upper sealing member drive member (130) (as shown in FIG. 19), the upper sealing member drive member is driven to the direction of disengaging the shift pin (175), shift pin (175) moves out of shift pin groove (137) in the axial direction, and rotates without contacting against the shift pin block (138).

Similarly, the lower sealing member drive member also adopts the same structure of the shift pin groove and the shift pin block as the upper sealing member drive member, so that the lower sealing member drive member will not cause problem while the valve core rotating forwardly.

Besides, in order to enable more than a revolution beyond-stroke of the stem, the upper side of the upper sealing member drive member (130) is provided with a lock pin block (135), the lock pin block is located between the lock pin drive member and the base, the lock pin block is provided with a cam groove (136), and the lock pin cam (141) is arranged in the cam groove, so that the lock pin cannot move in the axial direction relative to the upper sealing member drive member (130).

This embodiment further increases the beyond-stroke of the valve stem, so that the valve stem can obtain a beyond-stroke close to 720°.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A ball valve with a split ball comprising:
a first sealing member;
a second sealing member;
an upper drive member;
the upper drive member in contact with both the first sealing member and the second sealing member via an upper tongue and an upper groove;
the upper tongue and the upper groove being primarily flat, planar surfaces;
a lower drive member;
the lower drive member in contact with both the first sealing member and the second sealing member via a lower tongue and a lower groove;
the lower tongue and the lower groove being primarily flat, planar surfaces;
whereby a combination of upward motion of the upper drive member and downward motion of the lower drive member causes outward motion of the first sealing member and outward motion of the second sealing member, thus sealing the ball valve.

2. The ball valve with a split ball of claim 1, further comprising:
a valve shaft;
the valve shaft causing operation of the first sealing member, the second sealing member, the upper drive member, and the lower drive member;
a lock pin holding member rotating with the valve shaft;
a locking cam affixed to the upper drive member;
the locking cam moving between a first position, where rotation of the valve shaft causes rotation of the upper drive member, and a second position, where rotation of the valve shaft does not cause rotation of the upper drive member;
whereby when the locking cam is in its second position, further motion of the valve shaft causes the upper drive member and lower drive member to move away from each other, thus causing extension of the first sealing member and the second sealing member.

3. The ball valve with a split ball of claim 1 wherein:
the upper tongue and upper groove each have flat, planar faces;
whereby use of planar faces creates a consistent bearing surface, and resists rotation of the upper tongue with respect to the upper groove, regardless of a position of the first sealing member with respect to the upper drive member.

4. The ball valve with a split ball of claim 1 wherein:
the ball valve is closed by movement of the upper drive member away from the lower drive member, which in turn causes motion of the first sealing member away from the second sealing member.

5. The ball valve with a split ball of claim 1 further comprising:
a flow passage;
the first sealing member and the second sealing member located on either side of the flow passage, without obstructing the flow passage;
whereby when in a fully open position, the first sealing member and the second sealing member are positioned at 90-degrees from the flow passage.

6. The ball valve with a split ball of claim 1 comprising:
an upper drive shaft affixed to the upper drive member;
the upper drive shaft including upper drive threads;
the upper drive member including an upper threaded hole;
the upper drive threads interfacing with the upper threaded hole;
a lower drive shaft affixed to the lower drive member;
the lower drive shaft including lower drive threads;
the lower drive member including a lower threaded hole;
the lower drive threads interfacing with the lower threaded hole;
whereby rotation of the upper drive shaft with respect to the upper drive member, and rotation of the lower drive shaft with respect to the lower drive member, causes the upper drive member to move away from the lower drive member, thus causing extension of the first sealing member and extension of the second sealing member.

7. A ball valve that is sealed by outward motion of sealing members, comprising:
a first sealing member and a second sealing member;
an upper driving member and a lower driving member;
upward motion of the upper driving member causing outward motion of both the first sealing member and the second sealing member;
downward motion of the lower driving member causing outward motion of both the first sealing member and the second sealing member;
the upper driving member interfacing with the first sealing member and the second sealing member via a first set of planar surfaces;
the lower driving member interfacing with the first sealing member and the second sealing member via a second set of planar surfaces;
whereby because the first set of planar surfaces and the second set of planar surfaces are flat, a contact area remains consistent as the upper driving member and lower driving member move with respect to the first sealing member and the second sealing member.

8. The ball valve of claim 7, further comprising:
a valve shaft;
the valve shaft causing operation of the first sealing member, the second sealing member, the upper driving member, and the lower driving member;
a lock pin holding member rotating with the valve shaft;
a locking cam affixed to the upper driving member;
the locking cam moving between a first position, where rotation of the valve shaft causes rotation of the upper driving member, and a second position where rotation of the valve shaft does not cause rotation of the upper driving member;
whereby when the locking cam is in its second position, further motion of the valve shaft causes the upper driving member and lower driving member to move away from each other, thus causing extension of the first sealing member and the second sealing member.

9. The ball valve of claim 7 wherein:
the first set of planar surfaces are formed with flat, planar faces;
whereby use of planar faces creates a consistent bearing surface regardless of a position of the first sealing member with respect to the upper driving member.

10. The ball valve of claim 7 wherein:
the ball valve is closed by movement of the upper driving member away from the lower driving member, which in turn causes motion of the first sealing member away from the second sealing member.

11. The ball valve of claim 7 further comprising:
a flow passage;
the first sealing member and the second sealing member located on either side of the flow passage, without obstructing the flow passage;
whereby when in a fully open position, the first sealing member and the second sealing member are positioned at 90-degrees from the flow passage.

12. The ball valve of claim 7 comprising:
an upper drive shaft affixed to the upper driving member;
the upper drive shaft including upper drive threads;
the upper driving member including an upper threaded hole;
the upper drive threads interfacing with the upper threaded hole;
a lower drive shaft affixed to the lower driving member;
the lower drive shaft including lower drive threads;
the lower driving member including a lower threaded hole;
the lower drive threads interfacing with the lower threaded hole;
whereby rotation of the upper drive shaft with respect to the upper driving member, and rotation of the lower drive shaft with respect to the lower driving member, causes the upper driving member to move away from the lower driving member, thus causing extension of the first sealing member and extension of the second sealing member.

13. A ball valve that seals by outward motion of two or more sealing surfaces driven by two or more driving members, the ball valve comprising:
two or more sealing members;
two or more driving members;
the two or more sealing members interfacing with the two or more driving members via four or more tracks;
each track of the four or more tracks substantially formed from a planar surface;
wherein the ball valve is closed by movement of the two or more driving members away from each other, which in turn causes motion of the two or more sealing members away from each other; and
whereby the planar surfaces ensure a consistent contact area regardless of the position of the two or more sealing members with respect to two or more driving members.

14. The ball valve of claim 13, further comprising:
a valve shaft;
the valve shaft causing operation of the two or more sealing members and the two or more driving members;
a lock pin holding member rotating with the valve shaft;
a locking cam affixed to one driving member of the two or more driving members;
the locking cam moving between a first position, where rotation of the valve shaft causes rotation of the two or more driving members, and a second position where rotation of the valve shaft does not cause rotation of the two or more driving members;
whereby when the locking cam is in its second position, further motion of the valve shaft causes the two or more driving members to move away from each other, thus causing extension of the two or more sealing members.

15. The ball valve of claim 13 wherein:
each track of the four or more tracks includes a planar face of constant width;
whereby use of planar faces creates a consistent bearing surface regardless of a position of the two or more sealing members with respect to the two or more driving members.

16. The ball valve of claim 13 further comprising:
a flow passage;
the two or more sealing members located across the flow passage, without obstructing the flow passage;
whereby when in a fully open position, the two or more sealing members positioned at 180-degrees from each other, and at 90-degrees from the flow passage.

17. The ball valve of claim 13 comprising:
the two or more driving members actuated by two or more drive shafts;
the two or more drive shafts including driving threads;
the two or more driving members included threaded holes;

the two or more drive shafts interfacing with the two or more sealing members via interaction between the driving threads and the threaded holes;

whereby rotation of the two or more drive shafts with respect to the two or more driving members causes the two or more driving members to move away from each other, thus causing extension of the two or more sealing members.

\* \* \* \* \*